United States Patent
Hattori et al.

(10) Patent No.: US 11,402,569 B2
(45) Date of Patent: Aug. 2, 2022

(54) OPTICAL SHEET FOR LIGHT GUIDE PLATE TYPE LIQUID CRYSTAL DISPLAY, BACKLIGHT UNIT FOR LIGHT GUIDE PLATE TYPE LIQUID CRYSTAL DISPLAY, AND LIGHT GUIDE PLATE TYPE LIQUID CRYSTAL DISPLAY

(71) Applicant: NITTO DENKO CORPORATION, Ibaraki (JP)

(72) Inventors: Daisuke Hattori, Ibaraki (JP); Kozo Nakamura, Ibaraki (JP); Takahiro Yoshikawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/482,076

(22) PCT Filed: Jan. 30, 2018

(86) PCT No.: PCT/JP2018/002909
§ 371 (c)(1),
(2) Date: Jul. 30, 2019

(87) PCT Pub. No.: WO2018/143176
PCT Pub. Date: Aug. 9, 2018

(65) Prior Publication Data
US 2020/0116921 A1  Apr. 16, 2020

(30) Foreign Application Priority Data

Jan. 31, 2017  (JP) .............................. JP2017-016190

(51) Int. Cl.
G02B 6/00 (2006.01)
F21V 8/00 (2006.01)
G02F 1/1335 (2006.01)

(52) U.S. Cl.
CPC ......... G02B 6/0088 (2013.01); G02B 6/0051 (2013.01); G02B 6/0053 (2013.01);
(Continued)

(58) Field of Classification Search
CPC .. G02B 6/0088; G02B 6/0051; G02B 6/0053; G02B 6/0055; G02B 6/0065
(Continued)

(56) References Cited

U.S. PATENT DOCUMENTS 6,791,649 B1   9/2004  Nakamura et al.
2005/0117217 A1  6/2005  Tamaoka et al.
(Continued)

FOREIGN PATENT DOCUMENTS

CN  101128752 A  2/2008
CN  102648427 A  8/2012
(Continued)

OTHER PUBLICATIONS

International Search Report dated Apr. 24, 2018, issued in counterpart application No. PCT/JP2018/002909 (2 pages).
(Continued)

*Primary Examiner* — Christopher M Raabe
(74) *Attorney, Agent, or Firm* — WHDA, LLP

(57) ABSTRACT

The present invention provides an optical sheet for a light guide plate type liquid crystal display, including a low refractive index layer having an extremely low refractive index. The optical sheet A12 for a light guide plate type liquid crystal display (1000) according to the present invention includes a first optical film (light guide plate) (1010), a low refractive index layer (20), and a second optical film (reflection plate) (1020) laminated in this order, and the low refractive index layer (20) has a refractive index of 1.25 or less.

9 Claims, 5 Drawing Sheets

(52) U.S. Cl.
CPC ......... *G02B 6/0055* (2013.01); *G02B 6/0065* (2013.01); *G02F 1/133528* (2013.01); *G02F 1/133567* (2021.01)

(58) Field of Classification Search
USPC ........................................................ 362/607
See application file for complete search history.

(56) References Cited

U.S. PATENT DOCUMENTS

| | | |
|---|---|---|
| 2006/0154044 A1 | 7/2006 | Yamada et al. |
| 2006/0269724 A1 | 11/2006 | Ohashi et al. |
| 2008/0075895 A1 | 3/2008 | Tamaki et al. |
| 2012/0287677 A1 | 11/2012 | Wheatley et al. |
| 2013/0170218 A1 | 7/2013 | Wolk et al. |
| 2013/0202867 A1 | 8/2013 | Coggio et al. |
| 2015/0131317 A1 | 5/2015 | Yuki et al. |
| 2015/0277011 A1 | 10/2015 | Nakamura et al. |
| 2016/0281828 A1* | 9/2016 | Haka .................... F16H 37/021 |
| 2017/0227705 A1 | 8/2017 | Araki et al. |
| 2017/0341336 A1 | 11/2017 | Haruta et al. |

FOREIGN PATENT DOCUMENTS

| | | |
|---|---|---|
| CN | 102754003 A | 10/2012 |
| CN | 104950374 A | 9/2015 |
| JP | 10-62626 A | 3/1998 |
| JP | 2000-294021 A | 10/2000 |
| JP | 2001-188104 A | 7/2001 |
| JP | 2004-182491 A | 7/2004 |
| JP | 2006-011175 A | 1/2006 |
| JP | 2006-215542 A | 8/2006 |
| JP | 2008-040171 A | 2/2008 |
| JP | 2009-063898 A | 3/2009 |
| JP | 2010-189212 A | 9/2010 |
| JP | 2012-156082 A | 8/2012 |
| JP | 2015-516872 A | 6/2015 |
| JP | 2015-200865 A | 11/2015 |
| KR | 10-2005-0019709 A | 3/2005 |
| KR | 10-2012-0115568 A | 10/2012 |
| KR | 10-2013-0129942 A | 11/2013 |
| TW | 201431685 A | 8/2014 |
| TW | 201638612 A | 11/2016 |
| WO | 2004/113966 A1 | 12/2004 |
| WO | 2011/071728 A1 | 6/2011 |
| WO | 2011/100277 A1 | 8/2011 |
| WO | 2013/148407 A1 | 10/2013 |
| WO | 2013/180024 A1 | 12/2013 |
| WO | 2014/077228 A1 | 5/2014 |
| WO | 2016/031397 A1 | 3/2016 |
| WO | 2016/104764 A1 | 6/2016 |
| WO | 2016/204234 A1 | 12/2016 |

OTHER PUBLICATIONS

Office Action dated Jul. 25, 2019, issued in counterpart of Japanese Patent Application No. 2017-016190 with English Translation (10 pages).
Office Action dated Sep. 3, 2019, issued in counterpart JP Application No. 2017-016190, with English translation (4 pages).
Extended (Supplementary) European Search Report dated Jun. 30, 2020, issued in counterpart application No. 18747405.1. (7 pages).
Office Action dated Sep. 4, 2020, issued in counterpart KR Application No. 10-2019-7019759, with English Translation. (10 pages).
Office Action dated Jun. 16, 2021, issued in counterpart EP application No. 18 747 405.1. (5 pages).
Office Action dated Jun. 15, 2021, issued in counterpart CN application No. 201880007451.4, with English translation. (16 pages).
Office Action dated Jul. 23, 2021, issued in counterpart KR application No. 10-2019-7019759, with English translation. (13 pages).
Office Action dated Oct. 29, 2021, issued in TW Patent Application No. 107112389, with partial English Translation. (9 pages).
Office Action dated Oct. 18, 2021, issued in CN Application No. 201780085241.2, with partial English translation. (Counterpart to U.S. Appl. No. 16/482,105:(22 pages).
Final Office Action dated Oct. 6, 2021, issued in U.S. Appl. No. 16/482,105 (11 pages).
Notification of Reasons for Rejection dated Oct. 5, 2021, issued in JP application No. 2017-194713, with English Translation, (counterpart to U.S. Appl. No. 16/482,105) (8 pages).
Office Action dated Feb. 21, 2022, issued in CN Application No. 201880007451.4, with English Translation. (14 pages).
Advisory Action dated Mar. 4, 2022, issued in U.S. Appl. No. 16/482,105 (5 pages).
Office Action dated May 13, 2022, issued in counterpart to KR Application No. 10-2019-7019759, with English Translation. (12 pages).

* cited by examiner

OPTICAL SHEET FOR LIGHT GUIDE PLATE TYPE LIQUID CRYSTAL DISPLAY, BACKLIGHT UNIT FOR LIGHT GUIDE PLATE TYPE LIQUID CRYSTAL DISPLAY, AND LIGHT GUIDE PLATE TYPE LIQUID CRYSTAL DISPLAY

TECHNICAL FIELD

The present invention relates to an optical sheet for a light guide plate type liquid crystal display, a backlight unit for a light guide plate type liquid crystal display, and a light guide plate type liquid crystal display.

BACKGROUND ART

In an optical device for a light guide plate type liquid crystal display (LCD), for example, an air layer having a low refractive index is used as a total reflection layer. Specifically, for example, optical film members (e.g., a light guide plate and a reflection plate) in a liquid crystal device are laminated via an air layer. However, due to trends toward thinner devices, it is desired to integrate the members. For this reason, the members are integrated by a pressure-sensitive adhesive/adhesive without intervention of an air layer (e.g., Patent Literature 1). However, if there is no air layer serving as a total reflection layer, oblique incident light is not totally reflected, and retroreflection cannot be used. Accordingly, light utilization efficiency may be lowered.

Therefore, it has been proposed to use a low refractive index layer instead of an air layer. For example, Patent Literature 2 describes a structure in which a light guide plate and a reflection plate are laminated via a layer having a lower refractive index than that of the light guide plate.

CITATION LIST

Patent Literatures

Patent Literature 1: JP 2012-156082 A
Patent Literature 2: JP H10-62626 A

SUMMARY OF INVENTION

Technical Problem

However, the refractive index of the low refractive index layer is considerably higher than that of the air layer. Thus, the low refractive index layer cannot sufficiently serve as an alternative to the air layer, and a reduction in optical characteristic could have not been avoided.

Hence, the present invention is intended to provide an optical sheet for a light guide plate type liquid crystal display, including a low refractive index layer having an extremely low refractive index, a backlight unit for a light guide plate type liquid crystal display, and a light guide plate type liquid crystal display.

Solution to Problem

In order to achieve the aforementioned object, the present invention provides an optical sheet for a light guide plate type liquid crystal display, including a first optical film, a low refractive index layer, and a second optical film laminated in this order, wherein the low refractive index layer has a refractive index of 1.25 or less.

The present invention also provides a backlight unit for a light guide plate type liquid crystal display, including the optical sheet for a light guide plate type liquid crystal display according to the present invention, an edge light, and a light guide plate.

The present invention also provides a light guide plate type liquid crystal display including the backlight unit for a light guide plate type liquid crystal display according to the present invention.

Advantageous Effects of Invention

The present invention can provide an optical sheet for a light guide plate type liquid crystal display, including a low refractive index layer having an extremely low refractive index, a backlight unit for a light guide plate type liquid crystal display, and a light guide plate type liquid crystal display.

DESCRIPTION OF EMBODIMENTS

Figure 1:
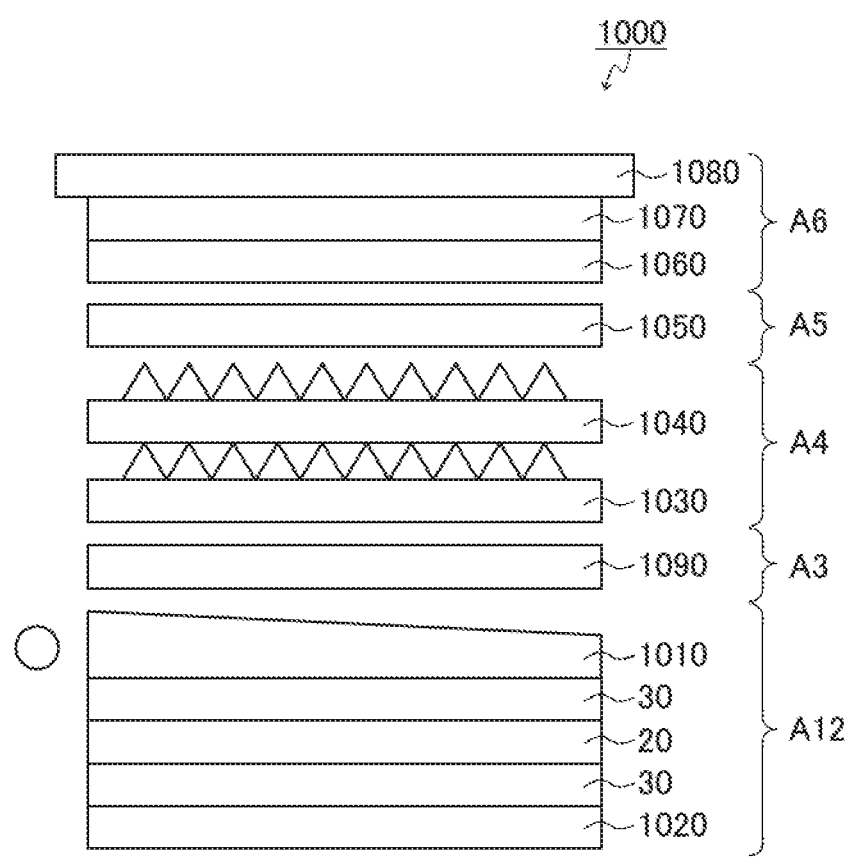
FIG. 1 is a cross-sectional view illustrating an example configuration of the optical sheet for a light guide plate type liquid crystal display, backlight unit for a light guide plate type liquid crystal display, and light guide plate type liquid crystal display according to the present invention.

The present invention will be described more specifically below with reference to illustrative examples. It is to be noted, however, that the present invention is not limited by the following descriptions.

The optical sheet for a light guide plate type liquid crystal display according to the present invention may be configured such that each of the first optical film or the second optical film is a lower polarizing plate, a brightness enhancement film, a prism sheet, a diffusion plate, a light guide plate, or a reflection plate, for example.

The optical sheet for a light guide plate type liquid crystal display according to the present invention may be configured such that at least one of the first optical film or the second optical film is a light guide plate, for example.

The optical sheet for a light guide plate type liquid crystal display according to the present invention may be configured such that at least one of the first optical film or the second optical film is a light guide plate, and the other is an optical member other than the light guide plate, for example. The optical member other than the light guide plate can be, for example, a reflection plate, a diffusion plate, or a prism sheet or a prism sheet with a diffusion function.

The optical sheet for a light guide plate type liquid crystal display according to the present invention may be configured such that it includes one or more optical films besides the first optical film and the second optical film, for example.

The optical sheet for a light guide plate type liquid crystal display according to the present invention may be configured such that at least one of the first optical film or the second optical film is laminated on the low refractive index layer via a pressure-sensitive adhesive/adhesive layer, for example. Hereinafter, in the case where the low refractive index layer and the first optical film are laminated on each other via a pressure-sensitive adhesive/adhesive layer, the pressure-sensitive adhesive/adhesive layer is also referred to as a "first pressure-sensitive adhesive/adhesive layer". Hereinafter, in the case where the low refractive index layer and the second optical film are laminated on each other via a pressure-sensitive adhesive/adhesive layer, the pressure-sensitive adhesive/adhesive layer is also referred to as a "second pressure-sensitive adhesive/adhesive layer".

The optical sheet for a light guide plate type liquid crystal display according to the present invention may be configured such that the low refractive index layer is a void-containing layer, for example. The low refractive index layer may be, for example, a void-containing layer having a void fraction of 35 vol % or more.

The optical sheet for a light guide plate type liquid crystal display according to the present invention may be configured such that, for example, the total thickness of the first pressure-sensitive adhesive/adhesive layer and the second pressure-sensitive adhesive/adhesive layer may be, for example, 85% or more, 88% or more, 90% or more, or 92% or more, and may be, for example, 99.9% or less, 99.5% or less, 99.3% or less, or 99.2% or less, relative to the total thickness of the first pressure-sensitive adhesive/adhesive layer, the low refractive index layer, and the second pressure-sensitive adhesive/adhesive layer.

The optical sheet for a light guide plate type liquid crystal display according to the present invention may be configured such that, for example, the light transmittance of the laminate including the first pressure-sensitive adhesive/adhesive layer, the low refractive index layer, and the second pressure-sensitive adhesive/adhesive layer is 80% or more. For example, the haze of the laminate including the first pressure-sensitive adhesive/adhesive layer, the low refractive index layer, and the second pressure-sensitive adhesive/adhesive layer may be 3% or less. The light transmittance may be, for example, 82% or more, 84% or more, 86% or more, or 88% or more, and the upper limit is not limited to particular values, but is ideally 100%, and may be, for example, 95% or less, 92% or less, 91% or less, or 90% or less. The haze of the laminate can be measured, for example, in the same manner as measuring the haze of the low refractive index layer to be described below. The light transmittance is a transmittance of light having a wavelength of 550 nm, and can be measured by, for example, the following measurement method.

(Measurement Method of Light Transmittance)

A spectrophotometer U-4100 (trade name, manufactured by Hitachi, Ltd.) is used. A low refractive index layer-containing pressure-sensitive adhesive/adhesive sheet (a laminate including the first pressure-sensitive adhesive/adhesive layer, the low refractive index layer, and the second pressure-sensitive adhesive/adhesive layer) to which a separator is not attached is a sample to be measured. The total light transmittance (light transmittance) of the sample is measured assuming that the total light transmittance of air being considered to be 100%. The value of the total light transmittance (light transmittance) is a value measured at a wavelength of 550 nm.

The method for producing an optical sheet for a light guide plate type liquid crystal display according to the present invention may include, although not particularly limited thereto, the steps of: forming a low refractive index layer on a transfer resin film base; and transferring the low refractive index layer onto a pressure-sensitive adhesive/adhesive layer, for example. Hereinafter, this production method is also referred to as a "first method for producing an optical sheet for a light guide plate type liquid crystal display". Regarding the "film" and the "sheet", generally, the one having a relatively small thickness is called a "film" and the one having a relatively large thickness is called a "sheet" in some cases, however, in the present invention, there is no particular distinction between the "film" and the "sheet".

The first method for producing an optical sheet for a light guide plate type liquid crystal display according to the present invention may further include, for example, the step of: attaching a separator to the surface of the pressure-sensitive adhesive/adhesive layer opposite to the low refractive index layer.

The first method for producing an optical sheet for a light guide plate type liquid crystal display according to the present invention may further include, for example, the step of: peeling off the transfer resin film base after the step of attaching the separator. In this case, it is preferable that that of the separator from the pressure-sensitive adhesive/adhesive layer be greater than the peeling force of the transfer resin film base from the low refractive index layer. The first method may further include, for example, the step of: peeling off the separator from the pressure-sensitive adhesive/adhesive layer and thereafter adhering a first optical film or a second optical film to the pressure-sensitive adhesive/adhesive layer. Moreover, for example, the pressure-sensitive adhesive/adhesive layer may be adhered directly on the first optical film or the second optical film without using the separator.

In the first method for producing an optical sheet for a light guide plate type liquid crystal display according to the present invention, for example, the transfer resin film base may be formed of an alicyclic structure-containing resin or an aliphatic structure-containing resin. Particularly desirable is an alicyclic structure-containing resin which is excellent in heat resistance from the viewpoint of durability against heat-drying and the like at the time of forming the low refractive index layer. The aliphatic structure-containing resin is not limited to particular resins, and examples thereof include polyolefin, polypropylene, and polymethylpentene. The alicyclic structure-containing resin is not limited to particular resins, and examples thereof include polynorbornene and cyclic olefin copolymer.

A method for producing an optical sheet for a light guide plate type liquid crystal display according to the present invention may include the steps of: directly coating a coating solution as a raw material of the low refractive index layer onto the pressure-sensitive adhesive/adhesive layer; and drying the coating solution. Hereinafter, this production method is also referred to as a "second method for producing an optical sheet for a light guide plate type liquid crystal display".

A method for producing an optical sheet for a light guide plate type liquid crystal display according to the present invention may include the steps of: directly coating a coating solution as a raw material of the low refractive index layer onto a first optical film or a second optical film; and drying the coating solution. Hereinafter, this production method is also referred to as a "third method for producing an optical sheet for a light guide plate type liquid crystal display". Hereinafter, the first, second, and third methods for producing an optical sheet for a light guide plate type liquid crystal display according to the present invention are collectively referred to as a "method for producing an optical sheet for a light guide plate type liquid crystal display according to the present invention".

As an example of a light guide plate type liquid crystal display (hereinafter also referred to as a "light guide plate type LCD"), there is an LED light guide plate type LCD using a light-emitting diode (LED) in a backlight (edge light). For example, optical films on the backlight side of the lower polarizing plate of the light guide plate type LCD can be laminated via an air layer serving to reflect light entered at an optically certain angle or more. In the LED light guide plate type LCD, for example, a reflection plate, a light guide plate (including LED), a diffusion plate, a prism sheet, a prism sheet with diffusion, a brightness enhancement film (reflection polarizing film), and a lower polarizing plate can be laminated in this order.

However, the intervention of the air layer may cause, for example, a reduction in optical characteristic due to deflection of the optical films associated with the increase in size of LCD. Moreover, when the air layer is contaminated, a yield in an assembly process for the light guide plate type LCD may be reduced, for example. Hence, in order to solve these problems, it is conceivable to integrate the optical films without using an air layer and reduce the number of optical films required to be laminated in the assembly process. However, at that time, there is no air layer serving as a total reflection layer by integrating the optical films simply with a pressure-sensitive adhesive/adhesive. Thus, as mentioned above, oblique incident light may not be totally reflected, and retroreflector may not be used. Accordingly, light utilization efficiency may be lowered.

One possible solution to the above-described problem is to cause a low refractive index layer to intervene instead of the air layer. However, the refractive index of the conventional low refractive index layer is considerably higher than that of the air layer as mentioned above. Thus, the low refractive index layer cannot sufficiently serve as an alternative to the air layer, and a reduction in optical characteristic could have not been avoided. In contrast, in the optical sheet for a light guide plate type liquid crystal display according to the present invention, the low refractive index layer has a refractive index of 1.25 or less, which is extremely low. Accordingly, excellent optical characteristics can be exhibited.

The optical sheet for a light guide plate type liquid crystal display according to the present invention can integrate optical films on the backlight side of the lower polarizing plate of the LED light guide plate type LCD, for example. Moreover, for example, optical films in an LED light guide plate type LCD (e.g., a light guide plate and a reflection plate, or a light guide plate type LCD, a reflection plate, and a diffusion plate) are integrated by the present invention. Thus, the number of members in an assembly process for the LCD can be reduced. Accordingly, opportunities of contaminations between the members can be reduced, and an assembly yield can be improved. Furthermore, a reduction in optical characteristic (brightness unevenness) due to distortion of the optical films (e.g., reflection plate) at the time of installation of the members associated with the increase in size of LCD can be eliminated.

In the case of handling the low refractive index layer while being fixed on the base, the total thickness including the low refractive index layer increases due to the thickness of the base, so that the thickness of the light guide plate type LCD is increased when the low refractive index layer is incorporated into the light guide plate type LCD to use. In contrast, the optical sheet for a light guide plate type liquid crystal display according to the present invention does not include a base, and the thickness thus can be reduced, for example. Specifically, there is almost no increase in thickness other than the thickness of the pressure-sensitive adhesive/adhesive layer itself by including no base, and the function of the low refractive index layer can be introduced into a light guide plate type LCD, for example. The present invention, however, is by no means limited thereto, and the optical sheet for a light guide plate type liquid crystal display according to the present invention may include a base, for example.

Moreover, the optical sheet for a light guide plate type liquid crystal display according to the present invention may be configured such that the low refractive index layer is laminated on each of the first optical film and the second optical film via a pressure-sensitive adhesive/adhesive layer, for example, as mentioned above. Accordingly, the pressure-sensitive adhesive/adhesive layer substantially can improve the strength of the low refractive index layer and protect the low refractive index layer from physical damage. This prevents the brittleness of the low refractive index layer from becoming a fatal problem. As the physical damage, specifically, for example, when optical films are integrated by a low refractive index layer, if the strength of the low refractive index layer is insufficient, the low refractive index layer may not withstand the distortion between the optical films caused by the difference in thermal expansion coefficient between the optical films. The pressure-sensitive adhesive/adhesive layer can protect the low refractive index layer from such distortion between the optical films. For example, the pressure-sensitive adhesive/adhesive layer can supplement the abrasion resistance of the low refractive index layer and protect the low refractive index layer from abrasion. Since the optical sheet for a light guide plate type liquid crystal display according to the present invention can be adhered to another member through the pressure-sensitive adhesive/adhesive layer, the low refractive index layer itself can be easily introduced into the light guide plate type LCD. That is, the optical sheet for a light guide plate type liquid crystal display according to the present invention allows the thinning and the physical protection of the low refractive index layer while maintaining a low refractive index layer having a high void fraction and also allows easy introduction of the function of the low refractive index layer into other light guide plate type LCDs while maintaining a high transparency, for example.

(1. Optical Sheet for a Light Guide Plate Type Liquid Crystal Display, Backlight Unit for a Light Guide Plate Type Liquid Crystal Display, and Light Guide Plate Type Liquid Crystal Display)

Figure 2:
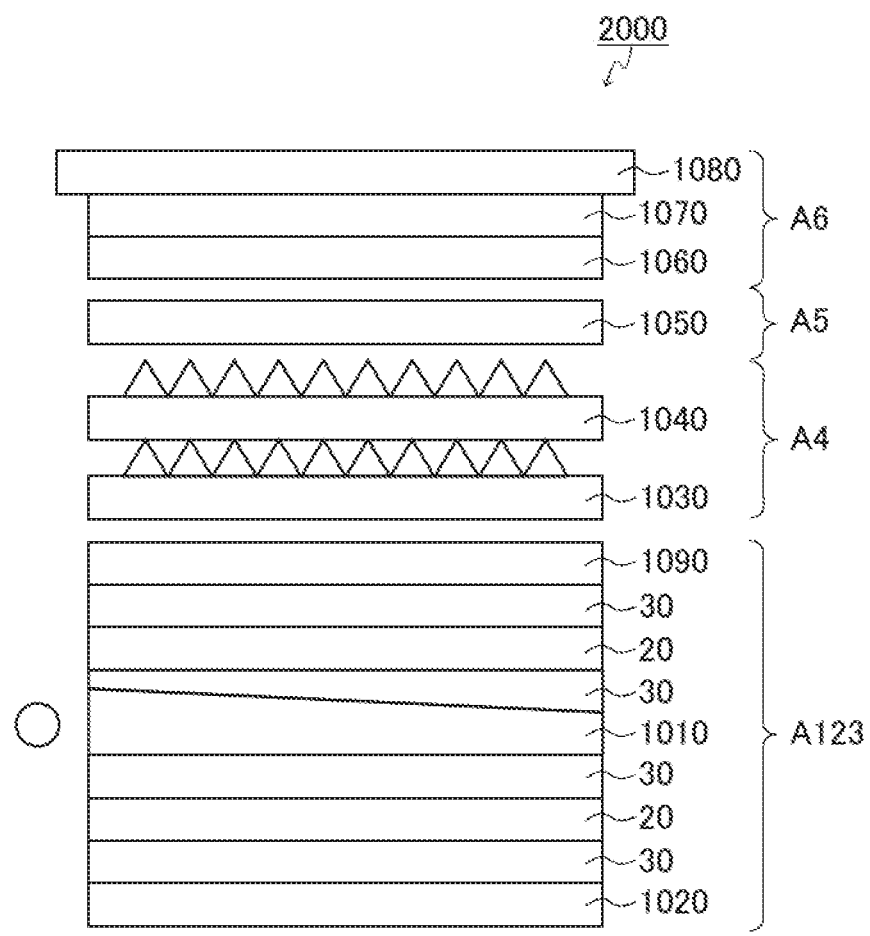
FIG. 2 is a cross-sectional view illustrating another example configuration of the optical sheet for a light guide plate type liquid crystal display, backlight unit for a light guide plate type liquid crystal display, and light guide plate type liquid crystal display according to the present invention.
Figure 6:
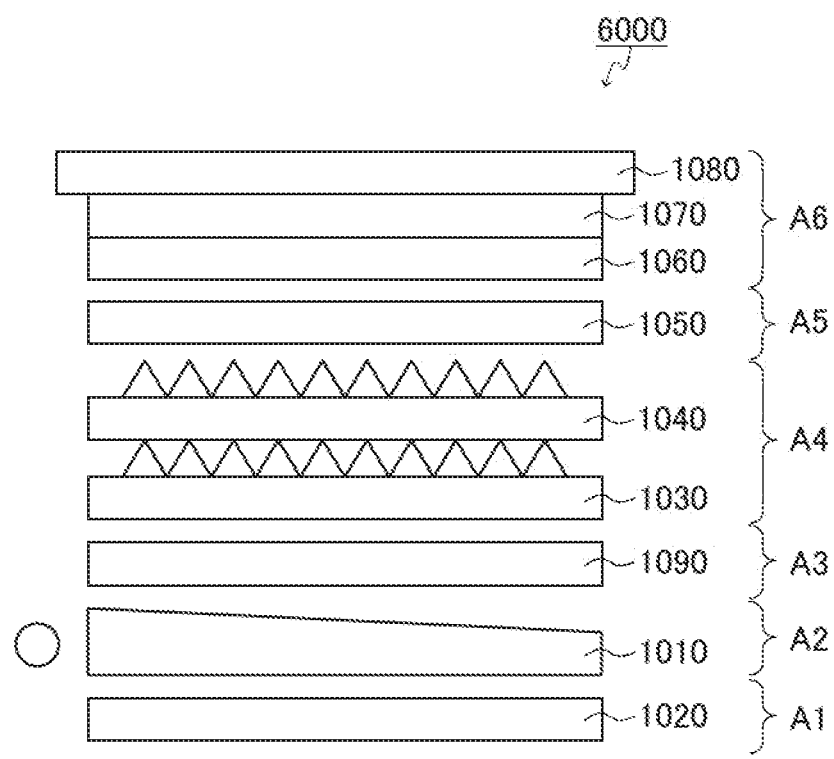
FIG. 6 is a cross-sectional view illustrating an example configuration of a light guide plate type liquid crystal display without the optical sheet for a light guide plate type liquid crystal display according to the present invention.

The following describes configurations of the optical sheet for a light guide plate type liquid crystal display, the backlight unit for a light guide plate type liquid crystal display, and the light guide plate type liquid crystal display according to the present invention with reference to illustrative examples using FIGS. 1, 2, and 6. While FIGS. 1, 2, and 6 are cross-sectional views, hatching is omitted for the sake of clarity.

An example configuration of a light guide plate type liquid crystal display (light guide plate type LCD) without a low refractive index layer is illustrated in the cross-sectional view of FIG. 6. As shown in FIG. 6, this light guide plate type LCD 6000 is configured by laminating units A1 to A6 in this order from the bottom. The unit A1 is configured by a reflection plate 1020. The unit A2 is configured by a light guide plate 1010. The light guide plate 1010 has an edge light. The unit A3 is configured by a diffusion plate 1090. The unit A4 is configured by laminating a prism sheet 1030 and a diffusion sheet (prism sheet with diffusion) 1040 in this order from the bottom. The unit A5 is configured by a brightness enhancement film 1050. The unit A6 is configured by laminating a lower polarizing plate 1060, a pressure-sensitive adhesive (pressure-sensitive adhesive/adhesive layer) 1070, and a liquid crystal panel 1080 in this order from the bottom. An air layer is disposed between the units A1 and A2 and is disposed between the units A2 and A3.

An example configuration of a light guide plate type liquid crystal display (light guide plate type LCD) according to the present invention is illustrated in the cross-sectional view of FIG. 1. As shown in FIG. 1, this light guide plate type LCD 1000 is the same as the light guide plate type LCD 6000 of FIG. 6 except that the units A1 and A2 are integrated via the pressure-sensitive adhesive/adhesive layer and the low refractive index layer to form an unit A12. More specifically, this light guide plate type LCD 1000 includes, instead of an air layer, a laminate including a low refractive index layer 20 and a pressure-sensitive adhesive/adhesive layer 30 between the units A1 and A2. In this laminate, the pressure-sensitive adhesive/adhesive layer 30 is laminated directly on each of both surfaces of the low refractive index layer 20. The reflection plate 1020 in the unit A1 and the light guide plate 1010 in the unit A2 are adhered to the low refractive index layer 20 via the pressure-sensitive adhesive/adhesive layer 30. In this manner, as mentioned above, the units A1 and A2 are integrated to form a unit A12. The low refractive index layer 20 has a refractive index of 1.25 or less. The unit A12 corresponds to the optical sheet for a light guide plate type liquid crystal display according to the present invention. Either the light guide plate 1010 or the reflection plate 1020 can be the first optical film, and the other can be the second optical film. The unit A12 is an optical sheet for a light guide plate type liquid crystal display, including a light guide plate 1010, and the light guide plate 1010 includes an edge light as described above. Thus, the unit A12 also corresponds to the backlight unit for a light guide plate type liquid crystal display according to the present invention.

In the light guide plate type LCD 1000 shown in FIG. 1, the low refractive index layer 20 has a refractive index of 1.25 or less, which is extremely low and is close to that of the air layer. Accordingly, excellent optical characteristics can be exhibited.

Further, in the light guide plate type LCD 1000 shown in FIG. 1, there is no base for fixing the low refractive index layer 20. Thus, the low refractive index layer 20 is introduced without thickness increase due to the base. Accordingly, the thickness of the light guide plate type LCD can be reduced.

Further, in the light guide plate type LCD 1000 shown in FIG. 1, the pressure-sensitive adhesive/adhesive layer 30 is laminated on each of both surfaces of the low refractive index layer 20. Thus, the low refractive index layer 20 is protected from physical damage. Specifically, for example, the low refractive index layer 20 can be protected from distortion caused by the difference in thermal expansion coefficient between the light guide plate 1010 and the reflection plate 1020. Moreover, the low refractive index layer 20 can be protected from abrasion at the time of incorporation of the low refractive index layer 20 into the light guide plate type LCD 1000.

Further, in the light guide plate type LCD 1000 shown in FIG. 1, an air layer is not intervened between the light guide plate 1010 and the reflection plate 1020. Accordingly, opportunities of contaminations between the light guide plate 1010 and the reflection plate 1020 can be reduced, and an assembly yield can be improved.

Another example configuration of a light guide plate type liquid crystal display (light guide plate type LCD) according to the present invention is illustrated in the cross-sectional view of FIG. 2. As shown in FIG. 2, this light guide plate type LCD 2000 is the same as the light guide plate type LCD 1000 of FIG. 1 except that the units A12 and A3 are integrated via the pressure-sensitive adhesive/adhesive layer and the low refractive index layer to form an unit A123. More specifically, this light guide plate type LCD 2000 includes, instead of an air layer, a laminate including a low refractive index layer 20 and a pressure-sensitive adhesive/adhesive layer 30 between the units A12 and A3. In this laminate, the pressure-sensitive adhesive/adhesive layer 30 is laminated directly on each of both surfaces of the low refractive index layer 20. The light guide plate 1010 in the unit A12 and the diffusion plate 1090 in the unit A3 are adhered to the low refractive index layer 20 via the pressure-sensitive adhesive/adhesive layer 30. In this manner, as mentioned above, the units A12 and A3 are integrated to form a unit A123. The low refractive index layer 20 has a refractive index of 1.25 or less. The unit A123 corresponds to the optical sheet for a light guide plate type liquid crystal display according to the present invention. Either the light guide plate 1010 or the diffusion plate 1090 can be the first optical film, and the other can be the second optical film. In the same manner as for the light guide plate type LCD 1000 shown in FIG. 1, either the light guide plate 1010 or the reflection plate 1020 can be the first optical film, and the other can be the second optical film. The unit A123 is an optical sheet for a light guide plate type liquid crystal display, including a light guide plate 1010, and the light guide plate 1010 includes an edge light as described above. Therefore, the unit A123 also corresponds to the backlight unit for a light guide plate type liquid crystal display according to the present invention.

In the light guide plate type LCD 2000 shown in FIG. 2, the light guide plate 1010 and the reflection plate 1020 are adhered to the low refractive index layer 20 via the pressure-sensitive adhesive/adhesive layer 30. Thus, the same advantageous effect as in the light guide plate type LCD 1000 shown in FIG. 1 is exhibited. In the light guide plate type LCD 2000 shown in FIG. 2, the light guide plate 1010 and the diffusion plate 1090 are adhered to the low refractive index layer 20 via the pressure-sensitive adhesive/adhesive layer 30. Thus, the same advantageous effect as described above is exhibited.

(2. Optical Sheet for Light Guide Plate Type Liquid Crystal Display and Production Method Thereof)

A method for producing an optical sheet for a light guide plate type liquid crystal display according to the present invention may be, although not particularly limited, for example, a first, second, or third method for producing an optical sheet for a light guide plate type liquid crystal display according to the present invention (a method for producing an optical sheet for a light guide plate type liquid crystal display according to the present invention). The following describes the production method with reference to illustrative examples. Hereinafter, a low refractive index layer which is a component of the optical sheet for a light guide plate type liquid crystal display according to the present invention is also referred to as "the low refractive index layer according to the present invention". Furthermore, the method for producing a low refractive index layer according to the present invention is also referred to as "the low refractive index layer production method according to the present invention".

(2-1. Low Refractive Index Layer and Low Refractive Index Layer Production Method)

The low refractive index layer according to the present invention may be formed of, for example, a silicon compound. Also, the low refractive index layer according to the present invention may be, for example, a low refractive index layer formed by chemically bonding microporous particles. For example, the microporous particles may be gel pulverized products.

In the low refractive index layer production method according to the present invention, for example, a gel pulverization step of pulverizing a porous gel material may be performed by one stage, however, is preferably performed by multiple stages. The number of the pulverization stages is not limited to particular numbers and may be, for example, two, three or more.

In the low refractive index layer production method according to the present invention, the multiple pulverization stages may include, for example, first and second pulverization stages of pulverizing a gel. The first pulverization stage may be, for example, a stage where the gel is pulverized into particles with a volume average particle diameter of 0.5 to 100 The second pulverization stage may be, for example, a stage where the particles after the first pulverization stage may further be pulverized into particles with a volume average particle diameter of 10 to 1000 nm. In this case, the pulverization stages may include, for example, another pulverization stage(s) besides the first and second pulverization stages.

In the present invention, the shape of the "particle" (e.g., the particle of the gel pulverized product) is not limited to particular shapes and may be, for example, a spherical shape or non-spherical shape. In the present invention, the particle of the gel pulverized product may be, for example, a sol-gel beaded particle, a nanoparticle (hollow nanosilica/nanoballoon particle), or a nanofiber.

In the present invention, for example, the gel is preferably a porous gel, and the gel pulverized product is preferably a porous gel pulverized product, although it is not limited thereto.

In the present invention, the gel pulverized product may be in at least one form selected from particulate forms, fibrous forms, and plate-like forms, for example. The particulate structural unit and the plate-like structural unit may be made of an inorganic substance, for example. The constituent element(s) of the particulate structural units includes at least one element selected from the group consisting of Si, Mg, Al, Ti, Zn, and Zr, for example. The particulate structure (structural unit) may be a solid particle or a hollow particle, and specific examples thereof include silicone particles, silicone particles having micropores, silica hollow nanoparticles, and silica hollow nanoballoons. The fibrous structural unit may be, for example, a nanofiber with a nano-sized diameter, and specific examples thereof include cellulose nanofibers and alumina nanofibers. The plate-like structural unit may be, for example, nanoclay, and specific examples thereof include nano-sized bentonite (e.g., Kunipia F (trade name)). The fibrous structural unit is not limited to particular units, and may be, for example, at least one fibrous substance selected from the group consisting of carbon nanofibers, cellulose nanofibers, alumina nanofibers, chitin nanofibers, chitosan nanofibers, polymer nanofibers, glass nanofibers, and silica nanofibers.

In the low refractive index layer production method according to the present invention, the gel pulverization step (e.g., multiple pulverization stages including the first pulverization stage and the second pulverization stage) may be performed in "another solvent", for example. The "another solvent" is described in detail below.

In the present invention, the "solvent" (e.g., a gel production solvent, a low refractive index layer production solvent, a replacement solvent) may not dissolve a gel or pulverized products thereof, and the gel or the pulverized products thereof may be dispersed or precipitated in the solvent.

The volume average particle diameter of the gel after the first pulverization stage may be, for example, from 0.5 to 100 from 1 to 100 from 1 to 50 from 2 to 20 or from 3 to 10 The volume average particle diameter of the gel after the second pulverization stage may be, for example, from 10 to 1000 nm, from 100 to 500 nm, or from 200 to 300 nm. The volume average particle diameter indicates a variation in particle size of the pulverized products in a liquid that contains the gel (gel-containing liquid). The volume average particle diameter can be measured using a particle size distribution analyzer based on dynamic light scattering, laser diffraction, or the like, or using an electron microscope such as a scanning electron microscope (SEM) or a transmission electron microscope (TEM), for example.

The shear viscosity in the liquid immediately after the first pulverization stage may be, for example, 50 mPa·s or more, 1000 mPa·s or more, 2000 mPa·s or more, or 3000 mPa·s or more and may be, for example, 100 Pa·s or less, 50 Pa·s or less, or 10 Pa·s or less, at a shear rate of 1000 1/s. The shear viscosity in the liquid immediately after the second pulverization stage may be, for example, 1 mPa·s or more, 2 mPa·s or more, or 3 mPa·s or more and may be, for example, 1000 mPa·s or less, 100 mPa·s or less, or 50 mPa·s or less. The method for measuring the shear viscosity is not limited to particular methods, and for example, as described in the examples to be described below, the shear viscosity can be measured using a vibration-type viscometer (trade name: FEM-1000V, manufactured by SEKONIC CORPORATION).

After the first pulverization stage, for example, the shear viscosity of the liquid containing the particles may be 50 mPa·s or more, and the volume average particle diameter of the particles may be from 0.5 to 50 μm.

The low refractive index layer production method according to the present invention preferably includes a concentration adjustment step of adjusting the concentration of the liquid that contains the gel (hereinafter also referred to as the "gel-containing liquid") before the first pulverization stage and after a solvent replacement step, however, may not include the concentration adjustment step. When the low refractive index layer production method according to the present invention includes the concentration adjustment step, for example, it is preferable that the concentration of the gel-containing liquid be not adjusted after the first pulverization stage.

In the concentration adjustment step, the concentration of the gel in the liquid that contains the porous gel material may be adjusted to, for example, 1 wt % or more, 1.5 wt % or more, 1.8 wt % or more, 2.0 wt % or more, or 2.8 wt % or more and may be adjusted to, for example, 5 wt % or less, 4.5 wt % or less, 4.0 wt % or less, 3.8 wt % or less, or 3.4 wt % or less. In the concentration adjustment step, the concentration of the gel in the gel-containing liquid may be adjusted to, for example, from 1 to 5 wt %, from 1.5 to 4.0 wt %, from 2.0 to 3.8 wt %, or from 2.8 to 3.4 wt %. From the viewpoint of the ease of handling of the gel in the gel pulverization step, the concentration of the gel is preferably not too high to prevent the viscosity of the gel from being too high. From the viewpoint of using the gel-containing liquid as a coating solution described below, the concentration of the gel is preferably not too low to prevent the viscosity of the gel from being too low. The concentration of the gel in the gel-containing liquid can be calculated by, for example, measuring the weight of the gel-containing liquid and the weight of the solid content (gel) after removing a solvent from the gel-containing liquid and dividing the latter measurement value by the former measurement value.

In the concentration adjustment step, for example, the concentration of the gel in the gel-containing liquid may be decreased by adding a solvent or may be increased by volatilizing a solvent to appropriately adjust the concentration. In the concentration adjustment step, for example, when the measured concentration of the gel in the gel-containing liquid is appropriate, the gel-containing liquid per se may be subjected to a subsequent step without increasing or decreasing the concentration (adjustment of the concentration). In the concentration adjustment step, for example, when the concentration of the gel in the gel-containing liquid is obviously appropriate without measurement, the gel-containing liquid per se may be subjected to a subsequent step without any measurement or adjustment of the concentration.

In the gel pulverization step, the rate of change in concentration of the gel in the gel-containing liquid in terms of wt % from immediately before the first pulverization stage to immediately after the last pulverization stage may be, for example, within ±3%, within ±2.8%, within ±2.6%, within ±2.4%, or within ±2.2%.

The low refractive index layer production method according to the present invention preferably further includes a gel form control step of controlling the shape and the size of the gel prior to the solvent replacement step. In the gel form control step, the size of the gel is preferably controlled not to be too small. When the size of the gel is not too small, the large amount of the solvent is adhered to the periphery of the gel pulverized finely, whereby problems where the measured concentration of the solvent is lower than the actual concentration, higher than the same because the solvent remains or varies widely can be easily prevented. When the size of the gel is not too large before the solvent replacement step, the solvent replacement efficiency is favorable. Moreover, in the gel form control step, the size of each gel is preferably controlled to be almost uniform. When the size of each gel is almost uniform, variations in particle diameter, concentration of the gel, and the like among lots of the gel pulverized product-containing liquid can be prevented, and a gel pulverized product-containing liquid having excellent uniformity can be easily obtained.

In the gel form control step, the length of the minor axis of the gel may be controlled to be, for example, 0.5 cm or more, 0.6 cm or more, 0.7 cm or more, or 0.8 cm or more and may be controlled to be, for example, 15 cm or less, 13 cm or less, 10 cm or less, or 8 cm or less. In the gel form control step, the length of the major axis of the gel may be controlled to be, for example, 30 cm or less, less than 30 cm, 28 cm or less, 25 cm or less, or 20 cm or less and may be controlled to be, for example, 1 cm or more, 2 cm or more, 3 cm or more, 4 cm or more, or 5 cm or more. In the present invention, the length of the "minor axis" of a solid (3D solid) refers to the measured length of a portion having the measurable shortest length in the solid. In the present invention, the length of the "major axis" of a solid (3D solid) refers to the measured length of a portion having the measurable longest length in the solid.

In the gel form control step, the shape of the gel is not limited to particular shapes, and the shape is only required to be controlled to be, for example, a cuboid (including cubic), a cylinder, a polygonal prism (e.g., triangular prism, hexagonal prism), a sphere, or an elliptical sphere (e.g., a rugby ball-like shape). Moreover, in the gel form control step, the shape of the gel is controlled to be preferably a cuboid or almost a cuboid because of the simplicity. When the shape of the gel is controlled to be cuboid in the gel form control step, the length of the short side may be controlled to be, for example, 0.5 cm or more, 0.6 cm or more, 0.7 cm or more, or 0.8 cm or more or may be controlled to be, for example, 15 cm or less, 13 cm or less, 10 cm or less, or 8 cm or less. When the shape of the gel is controlled to be rectangular in the gel form control step, the length of the long side may be controlled to be, for example, 30 cm or less, less than 30 cm, 28 cm or less, 25 cm or less, or 20 cm or less or may be controlled to be, for example, 1 cm or more, 2 cm or more, 3 cm or more, 4 cm or more, or 5 cm or more. In the present invention, the "short side" of the cuboid refers to a side having the shortest length, and the "long side" refers to a side having the longest length.

The gel form control step may be performed after or during (in parallel with) the gel production step of producing the gel, for example. More specifically, the gel form control step is performed as follows, for example.

In the gel form control step, the gel may be controlled to be a solid by cutting the gel in the state of being immobilized, for example. When the gel has really high brittleness, the gel may be non-uniformly crumbled with no relation to the cutting direction of the gel. Hence, when the pressure in the compressing direction applied at the time when the gel is cut is applied uniformly to the gel by immobilizing the periphery of the gel, the gel can be cut uniformly in the cutting direction. For example, the gel may be cut as follows. The shape of the gel before the solvent replacement step is almost a cuboid, and in the gel form control step, the gel is immobilized by bringing five out of six surfaces of the almost cuboid gel into contact with other substance, and in the state where the other surface is exposed, a cutting tool is inserted into the gel from the exposed surface. The cutting tool is not limited to particular tools, and examples thereof include a knife, a tool having a wire-like thin shape, and a tool having a thin, sharp, plate-like shape. Further, the gel may be cut in the other solvent, for example.

In the gel production step, the gel may be controlled to be a solid by solidifying a raw material of the gel in a mold (container) corresponding to the shape and the size of the solid, for example. Thus, even when the gel has really high brittleness, the gel can be controlled to be in a predetermined shape and size without cutting the gel, whereby the gel can be prevented from being non-uniformly crumbled with no relation to the cutting direction of the gel.

In the low refractive index layer production method according to the present invention, for example, the concentration of the gel in a liquid that contains the gel (gel-containing liquid) is measured after the first pulverization stage and before the last pulverization stage to subject only the liquid having the concentration of the gel within the predetermined numerical range to a subsequent pulverization stage. The liquid to be subjected to measurement of the concentration of the gel is required to be a homogeneous liquid and thus is preferably a liquid that has a high viscosity at a certain level and is difficult to be solid-liquid separated after the pulverization stage. As mentioned above, from the viewpoint of the ease of handling of the gel, the concentration of the gel is preferably not too high to prevent the viscosity of the gel from being too high, and from the viewpoint of using the gel-containing liquid as a coating solution, the concentration of the gel is preferably not too low to prevent the viscosity of the gel from being too low. For example, from such points of view, only the liquid having the concentration of the gel within the predetermined numerical range may be subjected to subsequent pulverization stages until the last pulverization stage is finished. The predetermined numerical range of the concentration of the gel is, for example, as mentioned above and may be, for example, 2.8 wt % or more and 3.4 wt % or less, although it is not limited thereto. The measurement of the concentration of the gel (concentration control) may be performed after the first pulverization stage and before the last pulverization stage as mentioned above. However, in addition to or instead of this, the concentration control may be performed either one or both of: after the solvent replacement step and before the gel pulverization step; and after the last pulverization stage (e.g., the second pulverization stage). Then, after the measurement of the concentration of the gel, for example, only the liquid having the concentration of the gel within the predetermined numerical range is subjected to a subsequent pulverization stage or is used as a gel pulverized product-containing liquid which is a completed product. Moreover, when the concentration of the gel is measured after the solvent replacement step and before the gel pulverization step, the concentration adjustment step may be performed thereafter if necessary.

In the concentration control after the solvent replacement step and before the gel pulverization step, the amount of the solvent adhered to the gel is unstable, whereby the measured concentration by each measurement varies widely in some cases. Thus, prior to the concentration control after the solvent replacement step before the gel pulverization step, the shape and the size of the gel is controlled to be almost uniform by the gel form control step. Accordingly, the concentration can be measured stably. Furthermore, for example, the concentration of the gel in the gel-containing liquid can be accurately controlled collectively.

In the low refractive index layer production method according to the present invention, at least one of the pulverization stages is preferably performed by a different pulverization technique from that of at least one of the other pulverization stages. All of the pulverization techniques in the pulverization stages may be different from one another, or some of them may be the same. For example, when the number of the pulverization stages is three, all of the three pulverization stages may be performed by different techniques (i.e., using three pulverization techniques), or two of them may be performed by the same pulverization technique, and the other pulverization stage is performed by a different pulverization technique. The pulverization technique is not limited to particular techniques, and examples thereof include a cavitation technique and a media-less technique.

In the low refractive index layer production method according to the present invention, the gel pulverized product-containing liquid may be, for example, a sol liquid containing particles (pulverized product particles) obtained by pulverizing the gel.

In the low refractive index layer production method according to the present invention, the pulverization stages may include a coarse pulverization stage and a main pulverization stage, and massive sol particles may be obtained by the coarse pulverization stage, and sol particles maintaining a porous gel network may then be obtained by the main pulverization stage.

The low refractive index layer production method according to the present invention further includes a classification step of classifying particles of the gel after at least one of the pulverization stages (e.g., at least one of the first pulverization stage and the second pulverization stage), for example.

The low refractive index layer production method according to the present invention further includes, for example, a gelation step of gelling a massive porous material in a solvent to obtain a gel. In this case, the gel obtained by the gelation step may be used in the first pulverization stage (e.g., the first pulverization stage) among the pulverization stages, for example.

The low refractive index layer production method according to the present invention further includes, for example, an aging step of aging the gel in a solvent. In this case, the gel after the aging step may be used in the first pulverization stage (e.g., the first pulverization stage) among the pulverization stages, for example.

In the low refractive index layer production method according to the present invention, a solvent replacement step of replacing the solvent with "another solvent" is performed after the gelation step, for example. In this case, the gel in "another solvent" may be used in the first pulverization stage (e.g., the first pulverization stage) among the pulverization stages, for example.

For example, the pulverization of the porous material is controlled while measuring the shear viscosity of the liquid in at least one of the pulverization stages (e.g., at least one of the first pulverization stage and the second pulverization stage) in the low refractive index layer production method according to the present invention.

At least one of the pulverization stages (e.g., at least one of the first pulverization stage and the second pulverization stage) in the low refractive index layer production method according to the present invention is performed by, for example, high pressure media-less pulverization.

In the low refractive index layer production method according to the present invention, the gel is, for example, a gel of a silicon compound at least containing three or less functional groups having saturated bonds.

Hereinafter, in the low refractive index layer production method according to the present invention, the gel pulverized product-containing liquid obtained by the steps including the gel pulverization step may be referred to as the "gel pulverized product-containing liquid according to the present invention".

The gel pulverized product-containing liquid according to the present invention allows, for example, the low refractive index layer according to the present invention as a functional porous material to be formed by forming a coating film of the liquid and chemically bonding the pulverized products in the coating film. The gel pulverized product-containing liquid according to the present invention also allows, for example, the low refractive index layer according to the present invention to be applied to various objects. Therefore, the gel pulverized product-containing liquid according to the present invention and the production method of the same are useful, for example, in the production of the low refractive index layer according to the present invention.

Since the gel pulverized product-containing liquid according to the present invention has, for example, significantly excellent uniformity, for example, when the low refractive index layer according to the present invention is applied to an optical member, the appearance of the member can be improved.

The gel pulverized product-containing liquid according to the present invention may be, for example, a gel pulverized product-containing liquid for obtaining a layer (low refractive index layer) having a high void fraction by applying (coating) the gel pulverized product-containing liquid onto a substrate and then drying the coated gel pulverized product-containing liquid. The gel pulverized product-containing liquid according to the present invention may be, for example, a gel pulverized product-containing liquid for obtaining a porous material (a bulk body having a large thickness or a massive bulk body) having a high void fraction. The bulk body can be obtained, for example, by performing bulk film formation using the gel pulverized product-containing liquid.

As mentioned above, the low refractive index layer according to the present invention may be a void-containing layer. Hereinafter, the low refractive index layer according to the present invention, which is a void-containing layer, may be referred to as the "void-containing layer according to the present invention". For example, the void-containing layer according to the present invention having a high void fraction can be produced by a production method including the steps of producing the gel pulverized product-containing liquid according to the present invention, coating the gel pulverized product-containing liquid onto a substrate to form a coating film, and drying the coating film.

Further, for example, a laminated film roll can be produced by a production method including the steps of producing the gel pulverized product-containing liquid according to the present invention, feeding the rolled resin film, coating the gel pulverized product-containing liquid onto the resin film to form a coating film, drying the coating film, and, after the drying step, winding up the laminated film in which the low refractive index layer according to the present invention is formed on the resin film. Hereinafter, such a production method may be referred to as the "laminated film roll production method according to the present invention". Hereinafter, the laminated film roll produced by the laminated film roll production method according to the present invention may be referred to as the "laminated film roll according to the present invention".

(2-2 Gel Pulverized Product-Containing Liquid and Production Method Thereof)

The gel pulverized product-containing liquid according to the present invention contains, for example, pulverized products of gel obtained in the gel pulverization step (the first pulverization stage and the second pulverization stage) and the other solvent.

The low refractive index layer production method according to the present invention may include, for example, as mentioned above, multiple pulverization stages of a gel pulverization step of pulverizing the gel (e.g., porous gel material), which may include, for example, the first pulverization stage and the second pulverization stage. The present invention will be described below with reference to examples in which a method for producing a gel pulverized product-containing liquid (hereinafter also referred to as the "gel pulverized product-containing liquid production method") according to the present invention includes the first pulverization stage and the second pulverization stage. The following description is made mainly for the case where the gel is a porous material (porous gel material). The present invention, however, is by no means limited thereto, and the description of the case where the gel is a porous material (porous gel material) can be applied in an analogical manner to other cases. Hereinafter, the pulverization stages (e.g., the first pulverization stage and the second pulverization stage) in the low refractive index layer production method according to the present invention may be collectively also referred to as the "gel pulverization step".

The gel pulverized product-containing liquid according to the present invention can be used in the production of a functional porous material that exhibits the same function as an air layer (e.g., a refractive index) as mentioned below. The functional porous material may be, for example, the low refractive index layer according to the present invention. Specifically, the gel pulverized product-containing liquid obtained by the production method according to the present invention contains pulverized products of the porous gel material, the three-dimensional structure of the non-pulverized porous gel material in the pulverized products is destroyed, whereby a new three-dimensional structure different from that of the non-pulverized porous gel material can be formed in the pulverized products. Thus, for example, a coating film (functional porous material precursor) formed using the gel pulverized product-containing liquid becomes a layer having a new pore structure (new void-containing structure) that cannot be obtained in a layer formed using the non-pulverized porous gel material. The layer having a new pore structure can exhibit the same function (have, for example, the same refractive index) as the air layer. Further, for example, since pulverized products of the gel pulverized product-containing liquid according to the present invention have residual silanol groups, after forming a new three-dimensional structure as the coating film (functional porous material precursor), the pulverized products can be bonded chemically to each other. Thus, even though the functional porous material to be formed has a structure with void spaces, it can maintain a sufficient strength and sufficient flexibility. Therefore, according to the present invention, the functional porous material can be easily and simply applied to various objects. The gel pulverized product-containing liquid obtained by the production method according to the present invention is very useful, for example, in the production of the porous structure which can be a substitute for an air layer. In the case of forming an air layer, it is necessary to laminate the components with a space therebetween by providing a spacer or the like to form an air layer between components, for example. However, the functional porous material formed by using the gel pulverized product-containing liquid according to the present invention can exhibit the same function as the air layer by simply disposing it on an intended site. Therefore, as mentioned above, the present invention can allow various objects to exhibit the same function as that of an air layer easily and simply as compared with the case of forming the air layer.

The gel pulverized product-containing liquid according to the present invention also can be referred to as, for example, a solution for forming the functional porous material or a solution for forming a low refractive layer. In the gel pulverized product-containing liquid according to the present invention, the porous material is the pulverized product.

The range of the volume average particle diameter of the pulverized products (particles of porous gel material) in the gel pulverized product-containing liquid according to the present invention is, for example, from 10 to 1000 nm, from 100 to 500 nm, and from 200 to 300 nm. The volume average particle diameter indicates a variation in particle size of the pulverized products in the gel pulverized product-containing liquid according to the present invention. The volume average particle diameter can be measured using a particle size distribution analyzer based on dynamic light scattering, laser diffraction, or the like, or using an electron microscope such as a scanning electron microscope (SEM) or a transmission electron microscope (TEM), as mentioned above, for example.

The concentration of the gel pulverized products in the gel pulverized product-containing liquid according to the present invention is not limited to particular concentrations and is, for example, from 2.5 to 4.5 wt %, from 2.7 to 4.0 wt %, or from 2.8 to 3.2 wt % as particles with a particle diameter from 10 to 1000 nm.

The gel (e.g., porous gel material) in the gel pulverized product-containing liquid according to the present invention is not limited to particular gels and can be, for example, a silicon compound.

The silicon compound is not limited to particular compounds and can be, for example, a silicon compound at least containing three or less functional groups having saturated bonds. "Containing three or less functional groups having saturated bonds" means that the silicon compound contains three or less functional groups, and these functional groups have saturated bonds with silicon (Si).

The silicon compound is, for example, a compound represented by the following chemical formula (2).

(2)

In the chemical formula (2), for example, X is 2, 3, or 4,
$R^1$ and $R^2$ are each a linear or branched alkyl group,
$R^1$ and $R^2$ may be the same or different from each other,
$R^1$ may be the same or different from each other when X is 2, and
$R^2$ may be the same or different from each other.
X and $R^1$ are the same as those in the chemical formula (1), for example. Regarding $R^2$, reference can be made to the description as to the examples of $R^1$ in the chemical formula (1), for example.

A specific example of the silicon compound represented by the chemical formula (2) is the one in which X is 3, which is a compound represented by the following chemical formula (2'). In the chemical formula (2'), $R^1$ and $R^2$ are the same as those in the chemical formula (2). When $R^1$ and $R^2$ are both methyl groups, the silicon compound is trimethoxy(methyl)silane (also referred to as "MTMS" hereinafter).

(2')

In the gel pulverized product-containing liquid according to the present invention, the concentration of the pulverized products of porous gel material in the solvent is not limited to particular concentrations, and is, for example, in the range from 0.3% to 50% (v/v), 0.5% to 30% (v/v), or 1.0% to 10% (v/v). When the concentration of the pulverized products is too high, the fluidity of the gel pulverized product-containing liquid is reduced considerably, which may result in aggregation and the formation of coating streaks during the coating, for example. On the other hand, when the concentration of the pulverized products is too low, it may take a long time to dry the solvent, and besides, the residual solvent immediately after the drying may increase to lower the void fraction, for example.

The physical properties of the gel pulverized product-containing liquid according to the present invention are not limited to particular properties. The shear viscosity of the gel pulverized product-containing liquid is, for example, in the range from 1 mPa·s to 1 Pa·s, from 1 to 500 mPa·s, from 1 to 50 mPa·s, from 1 to 30 mPa·s, from 1 to 10 mPa·s, from 10 mPa·s to 1 Pa·s, from 10 to 500 mPa·s, from 10 to 50 mPa·s, from 10 to 30 mPa·s, from 30 mPa·s to 1 Pa·s, from 30 to 500 mPa·s, from 30 to 50 mPa·s, 50 mPa·s to 1 Pa·s, from 50 to 500 mPa·s, or 500 mPa·s to 1 Pa·s, at a shear rate of 1000 l/s. When the shear viscosity is too high, for example, coating streaks may be formed, which may cause defects such as a decrease in transfer ratio in gravure coating. On the other hand, when the shear viscosity is too low, for example, it may not be possible to provide a sufficient wet thickness of the gel pulverized product-containing liquid when coating the gel pulverized product-containing liquid, so that a desired thickness cannot be obtained after drying.

In the gel pulverized product-containing liquid according to the present invention, the solvent can be, for example, a dispersion medium. The dispersion medium (hereinafter, also referred to as "coating solvent") is not limited to particular media and can be, for example, a gelation solvent or a pulverization solvent and is preferably the pulverization solvent. The coating solvent contains an organic solvent having a boiling point of 70° C. or higher and less than 180° C. and a saturation vapor pressure of 15 kPa or less at 20° C.

Examples of the organic solvent include carbon tetrachloride, 1,2-dichloroethane, 1,1,2,2-tetrachloroethane, trichloroethylene, isopropyl alcohol, isopropyl alcohol, isopentyl alcohol, 1-pentyl alcohol (pentanol), ethyl alcohol (ethanol), ethylene glycol monoethyl ether, ethylene glycol monoethyl ether acetate, ethylene glycol mono-n-butyl ether, ethylene glycol monomethyl ether, xylene, cresol, chlorobenzene, isobutyl acetate, isopropyl acetate, isopentyl acetate, ethyl acetate, n-butyl acetate, n-propyl acetate, n-pentyl acetate, cyclohexanol, cyclohexanone, 1,4-dioxane, N,N-dimethylformamide, styrene, tetrachloroethylene, 1,1,1-trichloroethane, toluene, 1-butanol, 2-butanol, methyl isobutyl ketone, methyl ethyl ketone, methyl cyclohexanol, methyl cyclohexanone, methyl n-butyl ketone, and isopentanol. The dispersion medium may contain an appropriate amount of a perfluoro-based surfactant or silicon-based surfactant that reduces the surface tension.

The gel pulverized product-containing liquid according to the present invention can be, for example, a sol particle liquid obtained by dispersing the pulverized products in the dispersion medium. By coating the gel pulverized product-containing liquid according to the present invention onto the base, drying the liquid, and chemically crosslinking the particles in the liquid in the bonding step to be described below, for example, a void-containing layer having film strength at or above a certain level can be formed continuously. The term "sol" as used in the present invention refers to a state where, by pulverizing a three-dimensional structure of a gel, pulverized products (i.e., particles of porous sol material each having a three-dimensional nanostructure holding part of the void-containing structure) are dispersed in a solvent and exhibit fluidity.

A catalyst for chemically bonding the pulverized products of the gel to each other can be added to the gel pulverized product-containing liquid according to the present invention, for example. The content of the catalyst is not limited to particular contents and is, for example, from 0.01 to 20 wt %, from 0.05 to 10 wt %, or from 0.1 to 5 wt %, relative to the weight of the gel pulverized products.

The gel pulverized product-containing liquid according to the present invention may contain a crosslinking assisting agent for indirectly bonding the pulverized products of the gel, for example. The content of the crosslinking assisting agent is not limited to particular contents and is, for example, from 0.01 to 20 wt %, from 0.05 to 15 wt %, or from 0.1 to 10 wt % with respect to the weight of the pulverized product of the gel.

The proportion of functional groups that are not involved in a crosslinked structure inside the gel among functional groups of structural unit monomers of the gel in the gel pulverized product-containing liquid according to the present invention may be, for example, 30 mol % or less, 25 mol % or less, 20 mol % or less, or 15 mol % or less, and may be, for example, 1 mol % or more, 2 mol % or more, 3 mol % or more, or 4 mol % or more. The proportion of functional groups that are not involved in the crosslinked structure inside the gel can be measured as follows, for example.

(Measurement Method of Proportion of Functional Groups that are not Involved in Crosslinked Structure Inside Gel)

The gel after drying is subjected to a solid state NMR (Si-NMR), and the proportion of residual silanol groups that are not involved in a crosslinked structure (functional groups that are not involved in the crosslinked structure inside the gel) is calculated from the peak ratio obtained by the NMR. Further, even when the functional group is other than the silanol group, the proportion of the functional groups that are not involved in a crosslinked structure inside the gel can be calculated from the peak ratio obtained by the NMR according to this method.

The following describes the gel pulverized product-containing liquid production method according to the present invention with reference to illustrative examples. Regarding the gel pulverized product-containing liquid according to the present invention, reference can be made to the following description unless otherwise stated.

In the gel pulverized product-containing liquid production method according to the present invention, a mixing step of mixing particles (pulverized products) of the porous gel material and the solvent is an optional step and may or may not be included. A specific example of the mixing step includes, for example, a step of mixing a dispersion medium and pulverized products of a gelled silicon compound (silicon compound gel) obtained from a silicon compound at least containing three or less functional groups having saturated bonds. In the present invention, the pulverized products of the porous gel material can be obtained from the porous gel material by the gel pulverization step to be described below, for example. The pulverized products of the porous gel material can be obtained from the porous gel material that is obtained after an aging treatment in an aging step to be described below, for example.

In the gel pulverized product-containing liquid production method according to the present invention, the gelation step is, for example, a step of gelling a massive porous material in a solvent to produce a porous gel material. A specific example of the gelation step can be, for example, a step of gelling a silicon compound at least containing three or less functional groups having saturated bonds in a solvent to generate a silicon compound gel.

The gelation step will be described below with reference to the case where the porous material is a silicon compound as an example.

The gelation step is, for example, a step of gelling the monomer silicon compound by a dehydration condensation reaction in the presence of a dehydration condensation catalyst, and by the gelation step, a silicon compound gel is obtained. The silicon compound gel has, for example, a residual silanol group, and the residual silanol group is preferably adjusted, as appropriate, according to the chemical bonding among pulverized products of the silicon compound gel to be described below.

In the gelation step, the silicon compound is only required to be gelled by a dehydration condensation reaction and is not limited to particular compounds. For example, the silicon compounds are bonded by the dehydration condensation. Bonding between the silicon compounds is, for example, hydrogen bonding or intermolecular force bonding.

The silicon compound can be, for example, a silicon compound represented by the chemical formula (1). The silicon compound represented by the chemical formula (1) has hydroxyl groups. Thus, silicon compounds of the chemical formula (1) can be bonded to each other by hydrogen bonding or intermolecular bonding via their hydroxyl groups, for example.

In the chemical formula (1), X is 2, 3, or 4, and $R^1$ is a linear or a branched alkyl group, for example. The number of carbon atoms in $R^1$ is 1 to 6, 1 to 4, or 1 to 2, for example. The linear alkyl group is a methyl group, an ethyl group, a propyl group, a butyl group, a pentyl group, or a hexyl group, for example. The branched alkyl group is an isopropyl group or an isobutyl group, for example. The X is 3 or 4, for example.

A specific example of the silicon compound represented by the chemical formula (1) is the one in which X is 3, which is a compound represented by the following chemical formula (1'). In the chemical formula (1'), $R^1$ is the same as that in the chemical formula (1), and is, for example, a methyl group. When $R^1$ is a methyl group, the silicon compound is tris(hydroxy)methylsilane. When X is 3, the silicon compound is a trifunctional silane having three functional groups, for example.

Another specific example of the silicon compound represented by the chemical formula (1) is the one in which X is 4. In this case, the silicon compound is a tetrafunctional silane having four functional groups, for example.

The silicon compound may be a precursor for forming a silicon compound represented by the chemical formula (1) by hydrolysis, for example. The precursor is not limited as long as it can generate the silicon compound when it is hydrolyzed, for example. A specific example of the silicon compound precursor is a compound represented by the chemical formula (2).

When the silicon compound is a precursor represented by the chemical formula (2), the production method according to the present invention may further include the step of hydrolyzing the precursor prior to the gelation step, for example.

The method for hydrolyzing the precursor is not limited to particular methods, and the precursor can be hydrolyzed through a chemical reaction in the presence of a catalyst, for example. Examples of the catalyst include acids such as an oxalic acid and an acetic acid. The hydrolysis reaction can be caused by, for example, adding an aqueous oxalic acid solution dropwise slowly to a solution of the silicon compound precursor in dimethylsulfoxide at room temperature and then stirring the resultant mixture for about 30 minutes. In hydrolysis of the silicon compound precursor, for example, by hydrolyzing the alkoxy group of the silicon compound precursor completely, it is possible to more efficiently achieve gelation and aging to be performed subsequently and heating and immobilization to be performed after the formation of a void-containing structure.

In the present invention, the silicon compound can be, for example, a hydrolysate of trimethoxy(methyl)silane.

The monomer silicon compound is not limited to particular compounds and can be selected, as appropriate, according to the intended use of the functional porous material to be produced, for example. In production of the functional porous material, the silicon compound preferably is the trifunctional silane in terms of its excellent properties to achieve a low refractive index when a premium is placed on the low refractive index, for example. The silicon compound preferably is the tetrafunctional silane from the viewpoint of imparting high abrasion resistance when a premium is placed on strength (e.g., abrasion resistance), for example. As the silicon compound, which is a raw material of the silicon compound gel, only one type of silicon compound may be used, or two or more types of silicon compounds may be used in combination, for example. Specifically, the silicon compound may be made up of the trifunctional silane only, the tetrafunctional silane only, or both the trifunctional silane and the tetrafunctional silane, for example. Also, the silicon compounds may further include a silicon compound(s) other than the trifunctional silane and the tetrafunctional silane, for example. When two or more types of silicon compounds are used as the silicon compounds, the ratio thereof is not limited to particular ratios and can be set as appropriate.

The gelation of porous material such as the silicon compound can be achieved by a dehydration condensation reaction of the porous bodies, for example. The dehydration condensation reaction preferably is performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst particularly preferably is a base catalyst. In the dehydration condensation reaction, the amount of the catalyst to be added relative to the porous material is not limited to particular materials, and is, for example, from 0.01 to 10 mol, from 0.05 to 7 mol, or from 0.1 to 5 mol per mole of the porous material.

The gelation of the porous material such as the silicon compound preferably is performed in a solvent, for example. The proportion of the porous material in the solvent is not limited to particular proportions. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One type of solvent may be used, or two or more types of solvents may be used in combination, for example. Hereinafter, the solvent used for the gelation also is referred to as a "gelation solvent".

The conditions for the gelation are not limited to particular conditions. The treatment temperature for treating the solvent containing the porous material is, for example, from 20° C. to 30° C., from 22° C. to 28° C., or from 24° C. to 26° C., and the treatment time for treating the same is, for example, from 1 to 60 minutes, from 5 to 40 minutes, or from 10 to 30 minutes. When the dehydration condensation reaction is performed, the treatment conditions are not limited to particular conditions, and the treatment conditions given above as examples also apply to the dehydration condensation reaction. When the porous material is a silicon compound, siloxane bonds are grown and silica primary particles are formed by the gelation, for example. As the reaction further proceeds, the primary particles are connected in the form of a string of beads, whereby a gel having a three-dimensional structure is generated.

The form of the gel obtained from the porous material in the gelation step is not limited to particular forms. The term "gel" generally refers to a solidified state of a solute where particles of the solute have lost their independent mobility owing to interaction and form an aggregate. Among various types of gels, a "wet gel" generally refers to a gel containing a dispersion medium in which particles of a solute build a uniform structure, and a "xerogel" generally refers to a gel from which a solvent is removed and in which particles of a solute form a network structure with void spaces. In the present invention, for example, wet gel is preferably used as the silicon compound gel. When the porous gel material is a silicon compound gel, the amount of a residual silanol group in the silicon compound gel is not limited to particular amounts and can be, for example, in the same range to be described below.

The porous gel material per se obtained by the gelation may be subjected to the solvent replacement step and the first pulverization stage or may be subjected to an aging treatment in the aging step prior to the first pulverization stage, for example. In the aging step, the gelled porous material (porous gel material) is aged in a solvent. The conditions for the aging treatment in the aging step are not limited to particular conditions, and for example, the porous gel material may be incubated in a solvent at a predetermined temperature. For example, by further growing the primary particles of the porous gel material having a three-dimensional structure obtained by the gelation through the aging treatment, it is possible to increase the size of the particles themselves. As a result, the contact area at the neck portion where the particles are in contact with each other increases so that the contact state can be changed from point contact to surface contact. The above-described aging treatment of the porous gel material improves the strength of the gel itself, for example, whereby the strength of the three-dimensional basic structures of the pulverized products after pulverization can be improved. As a result, it is possible to reduce the possibility that, in the drying step to be performed after coating a base with the gel pulverized product-containing liquid according to the present invention to form a coating film, pores in the void-containing structure formed by deposition of the three-dimensional basic structures may become smaller as the solvent in the coating film volatilizes during the drying step, for example.

As to the temperature for the aging treatment, the lower limit thereof is, for example, 30° C. or higher, 35° C. or higher, or 40° C. or higher. The upper limit thereof is, for example, 80° C. or lower, 75° C. or lower, or 70° C. or lower. The range thereof is, for example, from 30° C. to 80° C., from 35° C. to 75° C., or from 40° C. to 70° C. The predetermined time is not limited to particular times. The lower limit thereof is, for example, 5 hours or more, 10 hours or more, or 15 hours or more. The upper limit thereof is, for example, 50 hours or less, 40 hours or less, or 30 hours or less. The range thereof is, for example, from 5 to 50 hours, from 10 to 40 hours, or from 15 to 30 hours. Optimal aging conditions are, for example, as described above, conditions set to increase the size of the primary particles and to increase the contact area at the neck portion in the porous gel material. Furthermore, it is preferable to take the boiling point of the solvent used into consideration for the temperature in the aging treatment in the aging step, for example. For example, when the aging temperature is too high in the aging treatment, the solvent may volatilize excessively to cause defectiveness such that the pores in the three-dimensional void-containing structure are closed owing to the condensation of the concentration of the coating solution. On the other hand, for example, when the aging temperature is too low in the aging treatment, the effect of the aging cannot be obtained sufficiently. Besides, variation in temperature over time in a mass production process increases, which may result in products with poor quality.

In the aging treatment, the same solvent as in the gelation step can be used, for example. Specifically, it is preferable that a reactant obtained after the gelation treatment (i.e., the solvent containing the porous gel material) is subjected to the aging treatment as it is. When the porous gel material is the silicon compound gel, the amount of residual silanol groups contained in the silicon compound gel having been subjected to the gelation and the subsequent aging treatment by mole indicates, for example, the proportion of the residual silanol groups, assuming that the amount of the alkoxy groups in the raw material used in the gelation (e.g., the silicon compound or the precursor thereof) by mole is 100. The lower limit thereof is, for example, 50% or more, 40% or more, or 30% or more. The upper limit thereof is, for example, 1% or less, 3% or less, or 5% or less. The range thereof is, for example, from 1% to 50%, from 3% to 40%, or from 5% to 30%. For the purpose of increasing the hardness of the silicon compound gel, it is preferable that the amount of the residual silanol groups by mole is smaller, for example. When the amount of the silanol groups by mole is too large, there is a possibility that the void-containing structure cannot be maintained until the crosslinking of the functional porous material precursor is completed in formation of the functional porous material, for example. On the other hand, when the number of moles of the silanol groups is too small, there is a possibility that, in the bonding step, the functional porous material precursor cannot be crosslinked, so that a sufficient film strength cannot be imparted, for example. The above description is directed to an example where residual silanol groups are used.

When the silicon compounds that have been modified with various reactive functional groups are used as raw materials of the silicon compound gel, for example, the same phenomenon can be applied to each of the reactive functional groups.

The porous gel material per se obtained by the gelation is subjected to, for example, an aging treatment in the aging step, then a solvent replacement step, and thereafter the gel pulverization step. In the solvent replacement step, the solvent is replaced with another solvent.

In the present invention, the gel pulverization step is, as mentioned above, a step of pulverizing the porous gel material. The porous gel material after the gelation step may be subjected to the pulverization, and the porous gel material having been subjected to the aging treatment may further be subjected to the pulverization, for example.

Furthermore, as mentioned above, the gel form control step of controlling the shape and the size of the gel may be performed prior to the solvent replacement step (e.g., after the aging step). The shape and the size of the gel to be controlled in the gel form control step is not limited to particular shapes and sizes and are, for example, as mentioned above. The gel form control step may be performed by dividing the gel into solids (3D solid) in an appropriate size and shape, for example.

Moreover, as mentioned above, the gel pulverization step is performed after subjecting the gel to the solvent replacement step. In the solvent replacement step, the solvent is replaced with another solvent. When the solvent is not replaced with another solvent, the following problem may arise. For example, the catalyst and solvent used in the gelation step remain after the aging step to cause gelation of the liquid over time and affect the pot life of the gel pulverized product-containing liquid to be obtained finally, and the drying efficiency at the time when the coating film formed using the gel pulverized product-containing liquid is dried is reduced. Hereinafter, such a solvent in the gel pulverization step is also referred to as a "pulverization solvent".

The pulverization solvent (another solvent) is not limited to particular solvents, and may be, for example, an organic solvent. The organic solvent may be, for example, the one having a boiling point of 140° C. or lower, 130° C. or lower, 100° C. or lower, or 85° C. or lower. Specific examples thereof include isopropyl alcohol (IPA), ethanol, methanol, butanol, n-butanol, 2-butanol, isobutyl alcohol, pentyl alcohol, propylene glycol monomethyl ether (PGME), methyl cellosolve, and acetone. One type of pulverization solvent may be used, or two or more types of pulverization solvents may be used in combination, for example.

When the pulverization solvent has a low polarity, for example, the solvent replacement step is performed by multiple solvent replacement stages, and in the solvent replacement stages, the hydrophilicity of such a solvent may be caused to be lower in a subsequent stage than that in a prior stage. As a result, for example, solvent replacement efficiency can be improved, and the residual amount of a gel production solvent in the gel (e.g., DMSO) can be significantly reduced. Specifically, for example, the solvent replacement step is performed by three solvent replacement stages, and DMSO in a gel may be first replaced with water in the first solvent replacement stage, the water in the gel may then be replaced with IPA in the second solvent replacement stage, and the IPA in the gel may thereafter be replaced with isobutyl alcohol in the third solvent replacement stage.

The combination of the gelation solvent and the pulverization solvent is not limited to particular combinations, and examples thereof include the combinations of: DMSO and IPA; DMSO and ethanol; DMSO and isobutyl alcohol; and DMSO and n-butanol. By replacing the gelation solvent by the pulverization solvent as described above, it is possible to form a more uniform coating film in the formation of the coating film to be described below, for example.

The solvent replacement step is not limited to particular steps and can be performed as follows, for example. That is, first, the gel (e.g., gel after the aging treatment) produced in the gel production step is immersed in or brought into contact with another solvent to dissolve a gel production catalyst in the gel and an alcohol component and water generated by the condensation reaction in the solvent. Thereafter, the solvent in which the gel has been immersed or with which the gel has been brought into contact is drained, and the gel is again immersed or brought into contact with a new solvent. This is repeatedly performed until the residual amount of the gel production solvent in the gel becomes a desired amount. Each immersion time is, for example, 0.5 hours or more, 1 hour or more, or 1.5 hours or more. The upper limit thereof is not limited to particular times and is, for example, 10 hours or less. The immersion in the solvent may be performed by continuous contact of the solvent with the gel. The temperature during the immersion is not limited to particular temperatures and is, for example, from 20° C. to 70° C., from 25° C. to 65° C., or from 30° C. to 60° C. By heating, the solvent is replaced promptly, and the amount of the solvent required for replacement can be reduced. However, the solvent may be simply replaced at room temperature. Further, for example, when the solvent replacement step is performed by multiple solvent replacement stages, each of the solvent replacement stages may be performed in the above-mentioned manner.

Furthermore, for example, the solvent replacement step may be performed by multiple solvent replacement stages, and the hydrophilicity of such a solvent may be caused to be lower in a subsequent stage than that in a prior stage. In this manner, by changing the replacement solvent (another solvent) from the one having a high hydrophilicity to the one having a low hydrophilicity (a high hydrophobicity), the residual amount of the gel production solvent in the gel can be significantly reduced. In this way, for example, it is possible to produce a void-containing layer with a higher void fraction (e.g., low refractive index layer).

The residual amount of the gel production solvent in the gel after the solvent replacement step is preferably 0.005 g/ml or less, more preferably 0.001 g/ml or less, and particularly preferably 0.0005 g/ml or less. The lower limit of the residual amount of the gel production solvent in the gel is not limited to particular values, and is, for example, 0 or less than or equal to the detection limit value.

The residual amount of the gel production solvent in the gel after the solvent replacement step is measured, for example, as follows.

(Measurement Method of Residual Amount of Gel Production Solvent in Gel)

0.2 g of gel is collected, 10 ml of acetone is added thereto, and the resultant mixture is shaken using a shaker at 120 rpm at room temperature for 3 days, thereby performing an extraction. One μl of the extract is injected into a gas chromatography analyzer (trade name: 7890A, manufactured by Agilent Technologies Inc.) to analyze. In order to examine the reproducibility of the measurement, for example, the measurement may be performed by sampling two (n=2) or more times. Further, a calibration curve is prepared from an authentic sample, and the amounts of the respective components per one gram of gel are obtained, and the residual amount of the gel production solvent per one gram of gel is calculated.

When the solvent replacement step is performed by multiple solvent replacement stages, and the hydrophilicity of "another solvent" is caused to be lower in a subsequent stage than that in a prior stage, such a solvent (replacement solvent) is not limited to particular solvents. In the last solvent replacement stage, it is preferable that "another solvent" (replacement solvent) is a void-containing layer production solvent. Examples of the void-containing layer production solvent include a solvent having a boiling point of 140° C. or lower. Examples of the void-containing layer production solvent include alcohol, ether, ketone, an ester solvent, an aliphatic hydrocarbon solvent, and an aromatic solvent. Specific examples of the alcohol having a boiling point of 140° C. or lower include isopropyl alcohol (IPA), ethanol, methanol, n-butanol, 2-butanol, isobutyl alcohol (IBA), 1-pentanol, and 2-pentanol. Specific examples of the ether having a boiling point of 140° C. or lower include propylene glycol monomethyl ether (PGME), methyl cellosolve, and ethyl cellosolve. Specific examples of the ketone having a boiling point of 140° C. or lower include acetone, methyl ethyl ketone, methyl isobutyl ketone, and cyclopentanone. Specific examples of the ester solvent having a boiling point of 140° C. or lower include ethyl acetate, butyl acetate, isopropyl acetate, and normal propyl acetate. Specific examples of the aliphatic hydrocarbon solvent having a boiling point of 140° C. or lower include hexane, cyclohexane, heptane, and octane. Specific examples of the aromatic solvent having a boiling point of 140° C. or lower include toluene, benzene, xylene, and anisole. From the viewpoint of hardly eroding the base (e.g., resin film) during coating, the void-containing layer production solvent is preferably alcohol, ether, or an aliphatic hydrocarbon solvent. One type of pulverization solvent may be used, or two or more types of pulverization solvents may be used in combination, for example. In particular, from the viewpoint of low volatility at room temperature, isopropyl alcohol (IPA), ethanol, n-butanol, 2-butanol, isobutyl alcohol (IBA), pentyl alcohol, propylene glycol monomethyl ether (PGME), methyl cellosolve, heptane, and octane are preferred. In particular, in order to prevent gel material particles (e.g., silica compounds) from scattering, it is preferable that the saturation vapor pressure (volatility) of the void-containing layer production solvent be not too high. As such a solvent, for example, the one containing an aliphatic group having three or four or more carbon atoms is preferable, and the one containing an aliphatic group having four or more carbon atoms is more preferable. The solvent containing an aliphatic group having three or four or more carbon atoms may be, for example, alcohol. Specifically, for such a solvent, isopropyl alcohol (IPA), isobutyl alcohol (IBA), n-butanol, 2-butanol, 1-pentanol, and 2-pentanol are preferable and isobutyl alcohol (IBA) is particularly preferable, for example.

Another solvent (replacement solvent) in a stage other than the last solvent replacement stage is not limited to particular solvents, and examples thereof include alcohol, ether, and ketone. Specific examples of alcohol include isopropyl alcohol (IPA), ethanol, methanol, n-butanol, 2-butanol, isobutyl alcohol (IBA), and pentyl alcohol. Specific examples of ether include propylene glycol monomethyl ether (PGME), methyl cellosolve, and ethyl cellosolve. A specific example of ketone is acetone. Another solvent (replacement solvent) is not limited as long as it can replace the gel production solvent or "another solvent" (replacement solvent) in a previous stage. Also, another (replacement solvent) in a stage other than the last solvent replacement stage is preferably a solvent which does not finally remain in the gel or which hardly erode the base (e.g., resin film) during coating even if it remains in the gel. From the viewpoint of hardly eroding the base (e.g., resin film) during coating, "another solvent" (replacement solvent) in a stage other than the last solvent replacement stage is preferably alcohol. Thus, in at least one of the multiple solvent replacement stages, "another solvent" is preferably alcohol.

In the first solvent replacement stage, "another solvent" may be, for example, water or a mixed solvent that contains water in freely-selected proportion. Water or a mixed solvent that contains water is highly compatible with a gel production solvent (e.g., DMSO) having a high hydrophilicity, so that the gel production solvent can be easily replaced and is preferable in terms of costs.

The multiple solvent replacement stages may include a stage in which "another solvent" is water, then a stage in which "another solvent" is the one containing an aliphatic group having three or less carbon atoms, and thereafter a stage in which "another solvent" is the one containing an aliphatic group having four or more carbon atoms. At least one of the solvent containing an aliphatic group having three or less carbon atoms and the solvent containing an aliphatic group having four or more carbon atoms may be an alcohol. The alcohol having an aliphatic group having three or less carbon atoms is not limited to particular alcohols, and examples thereof include isopropyl alcohol (IPA), ethanol, methanol, and n-propyl alcohol. The alcohol having an aliphatic group having four or more carbon atoms is not limited to particular alcohols, and examples thereof include n-butanol, 2-butanol, isobutyl alcohol (IBA), and pentyl alcohol. For example, the solvent containing an aliphatic group having three or less carbon atoms may be isopropyl alcohol, and the solvent containing an aliphatic group having four or more carbon atoms may be isobutyl alcohol.

The inventors according to the present invention have found that it is very important to focus on the residual amount of the gel production solvent in order to form a void-containing layer having film strength under a relatively mild condition such as at 200° C. or lower, for example. This finding, which has found independently by the inventors according to the present invention, is not described in pieces of prior art including the patent literatures and non-patent literatures.

Although the reason (mechanism) why a void-containing layer having a low refractive index can be produced by reducing the residual amount of the gel production solvent in the gel is not necessarily clear, it is speculated as follows, for example. That is, as mentioned above, the gel production solvent is preferably a high-boiling-point solvent (e.g., DMSO) or the like for the progress of gelation reactions. In production of a void-containing layer by coating and drying a sol liquid produced from the gel, it is difficult to completely remove the high-boiling-point solvent at a normal drying temperature and drying time (for example, 1 minute at 100° C., although it is not particularly limited thereto). This is because if the drying temperature is too high or the drying time is too long, problems such as deterioration of the base may arise. In addition, it is speculated that the high-boiling-point solvent remaining at the time of coating and drying enters between the gel pulverized products and slips the pulverized products, whereby the pulverized products are densely deposited. This may decrease the void fraction, so that low refractive index is hardly achieved. That is, conversely, it is speculated that such a phenomenon can be prevented, and low refractive index can be achieved by reducing the residual amount of the high-boiling-point solvent. It is to be noted, however, that the above-described reasons (mechanisms) merely are examples based on the speculation and do not limit the present invention by any means.

In the present invention, the "solvent" (e.g., a gel production solvent, a void-containing layer production solvent, a replacement solvent) may not dissolve a gel or pulverized products thereof, and the gel or the pulverized products thereof may be dispersed or precipitated in the solvent.

As mentioned above, the gel production solvent may have a boiling point of 140° C. or higher, for example.

The gel production solvent is, for example, a water-soluble solvent. In the present invention, the "water-soluble solvent" refers to a solvent that can be mixed with water in a freely-selected ratio.

When the solvent replacement step is performed by multiple solvent replacement stages, the method is not particularly limited, and each of the solvent replacement stages can be performed, for example, as follows. That is, first, the gel is immersed in or brought into contact with "another solvent" to dissolve a gel production catalyst in the gel, an alcohol component generated by the condensation reaction, and water in "another solvent". Thereafter, the solvent in which the gel has been immersed or with which the gel has been brought into contact is drained, and the gel is again immersed or brought into contact with a new solvent. This is repeatedly performed until the residual amount of the gel production solvent in the gel becomes a desired amount. Each immersion time is, for example, 0.5 hours or more, 1 hour or more, or 1.5 hours or more. The upper limit thereof is not limited to particular times and is, for example, 10 hours or less. The immersion in the solvent may be performed by continuous contact of the solvent with the gel. The temperature during the immersion is not limited to particular temperatures and is, for example, from 20° C. to 70° C., from 25° C. to 65° C., or from 30° C. to 60° C. By heating, the solvent is replaced promptly, and the amount of the solvent required for replacement can be reduced. However, the solvent may be simply replaced at room temperature. This solvent replacement stage is performed a plurality of times by gradually changing "another solvent" (replacement solvent) from the one having a high hydrophilicity to the one having a low hydrophilicity (a high hydrophobicity). In order to remove a highly hydrophilic gel production solvent (e.g., DMSO), for example, it is simple and efficient to first use water as a replacement solvent, as mentioned above. After removing the DMSO or the like with water, the water in the gels is replaced with isopropyl alcohol and then with isobutyl alcohol (coating solvent) in this order, for example. That is, since water and isobutyl alcohol have low compatibility, the solvent replacement can be efficiently performed by once replacing with isopropyl alcohol and then with isobutyl alcohol, which is a coating solvent. However, this is an example, and, as mentioned above, "another solvent" (replacement solvent) is not particularly limited.

In the gel production method according to the present invention, for example, as mentioned above, the solvent replacement stage may be performed a plurality of times by gradually changing "another solvent" (replacement solvent) from the one having a high hydrophilicity to the one having a low hydrophilicity (having a high hydrophobicity). This can significantly reduce the residual amount of the gel production solvent in the gel as mentioned above. In addition, for example, it is possible to significantly reduce the amount of the solvent to be used and to reduce the cost, as compared with a case of performing the solvent replacement by one stage using only the coating solvent.

Moreover, after the solvent replacement step, the gel pulverization step of pulverizing the gel in the pulverization solvent is performed. Furthermore, for example, as mentioned above, the concentration of the gel may be performed, if necessary, after the solvent replacement step and prior to the gel pulverization step, and the concentration adjustment step may be performed thereafter if necessary. The concentration of the gel after the solvent replacement step and prior to the gel pulverization step can be measured as follows, for example. That is, first, a gel is taken out from "another solvent" (pulverization solvent) after the solvent replacement step. This gel is controlled to be masses in appropriate shapes and sizes (e.g., blocks) by the gel form control step, for example. A solvent adhered to the periphery of each mass of the gel is then removed, and the concentration of the solid in one mass of the gel is measured by weight dry method. At that time, the concentration of the solid in each of a plurality of randomly sampled masses (e.g., 6 masses) is measured, and variations of the measured concentrations from the average thereof are calculated, to determine reproducibility of the measured concentrations. In the concentration adjustment step, for example, the concentration of the gel in the gel-containing liquid may be decreased by adding "another solvent" (pulverization solvent). Alternatively, in the concentration adjustment step, for example, the concentration of the gel in the gel-containing liquid may be increased by evaporating "another solvent" (pulverization solvent).

In the gel pulverized product-containing liquid production method according to the present invention, for example, as described above, the gel pulverization step may be performed by one stage but is preferably performed by multiple stages. Specifically, for example, the first pulverization stage and the second pulverization stage may be performed. In addition to the first pulverization stage and the second pulverization stage, a further pulverization stage may be performed as the gel pulverization step. That is, in the gel pulverized product-containing liquid production method according to the present invention, the number of pulverization stages included in the pulverization step is not limited to two and may be three or more.

The first pulverization stage and the second pulverization stage will be described below.

The first pulverization stage is a step of pulverizing the porous gel material. The second pulverization stage is a step of further pulverizing particles of the porous gel material, performed after the first pulverization stage.

The volume average particle diameter of particles of the porous gel material obtained by each of the first pulverization stage and the second pulverization stage is, for example, as mentioned above. The method for measuring the volume average particle diameter is as mentioned above, for example.

The shear viscosity of the gel pulverized product-containing liquid immediately after each of the first pulverization stage and the second pulverization stage is, for example, as mentioned above. The method for measuring the shear viscosity is also as mentioned above, for example.

For example, as mentioned above, the concentration control of the gel-containing liquid may be performed by measuring the concentration of the gel in the gel-containing liquid immediately after the first pulverization stage, and only the liquid having a concentration of the gel in a predetermined numerical range is subjected to the second pulverization stage.

The method for pulverizing the porous gel material is not limited to particular methods. For example, the porous gel material can be pulverized using a high pressure media-less pulverizer, an ultrasonic homogenizer, a high-speed rotary homogenizer, a high pressure extrusion pulverizer, or a wet media-less pulverizer utilizing any other cavitation phenomenon. The first pulverization stage and the second pulverization stage may be performed by the same pulverization method or different pulverization methods and are preferably performed by different pulverization methods.

As either of the pulverization methods, at least one of the first pulverization stage or the second pulverization stage is preferably performed by a method for pulverizing the porous gel material through controlling energy. The method for pulverizing the porous gel material through controlling energy can be, for example, a method in which the pulverization is performed using a high pressure media-less pulverizer.

In the method for pulverizing the porous gel material using ultrasound, the pulverization strength is high, but it is difficult to control (adjust) the pulverization. In contrast, in the method for pulverizing the porous gel material through controlling energy, the pulverization can be performed while controlling (adjusting) it. Accordingly, a uniform gel pulverized product-containing liquid can be produced with the limited amount of work. This makes it possible to perform mass production of the gel pulverized product-containing liquid, for example.

An apparatus that performs media pulverization, such as a ball mill, physically destroys the void-containing structure of a gel during pulverization, for example. In contrast, a cavitation-type pulverizer such as a homogenizer is based on a media-less pulverizing method, and separates the bonded surfaces of porous particles already contained in a gel three-dimensional structure and bonded relatively weakly with a high speed shear force, for example. Thus, a new three-dimensional sol structure is obtained by pulverizing the porous gel material and can maintain, in formation of a coating film, a void-containing structure having a particle size distribution within a certain range and can form a void-containing structure again by deposition during coating and drying, for example. The conditions for the pulverization are not limited to particular conditions, and preferably are conditions that allow a gel to be pulverized without volatilizing a solvent by imparting a high speed flow instantaneously, for example. For example, it is preferable to pulverize the gel in such a manner that pulverized products having the above described variations in particle size (e.g., volume average particle diameter or particle size distribution) can be obtained. If the amount of work such as the pulverization time or the pulverization strength is not sufficient, coarse particles may remain, so that there is a possibility not only that fine pores cannot be formed but also that a high quality cannot be achieved due to increased defects in appearance, for example. On the other hand, if the amount of work is too much, sol particles to be obtained may be too fine to achieve a desired particle size distribution. This may reduce the size of void spaces formed by deposition of the particles after coating and drying, so that a desired void fraction may not be achieved, for example.

It is preferable to control pulverization of the porous material while measuring the shear viscosity of the liquid in at least one of the first pulverization stage and the second pulverization stage. Specific methods thereof include a method of preparing a sol liquid having both of a desired shear viscosity and significantly excellent uniformity in the middle of the pulverization stages and a method of performing inline monitoring of the shear viscosity of the liquid and feeding back the monitored results to the pulverization stages. Accordingly, a gel pulverized product-containing liquid having both of a desired shear velocity and significantly excellent uniformity can be prepared. Thus, for example, properties of the gel pulverized product-containing liquid can be controlled according to the intended use.

When the porous gel material is the silicon compound gel, the proportion of the residual silanol groups contained in the pulverized products after the pulverization stages is not limited to particular proportions and may be, for example, the same as in a range shown for the silicon compound gel after the aging treatment as an example.

The gel pulverized product-containing liquid production method according to the present invention may further include a classification step after at least one of the gel pulverization stages (the first pulverization stage and the second pulverization stage). In the classification step, particles of the porous gel material are classified. The "classification" refers to, for example, classification of particles of the porous gel material according to the particle diameter. The method for the classification is not limited to particular methods, and the classification can be performed using a sieve. As mentioned above, the uniformity of the porous gel material is significantly excellent by the pulverization treatment including a plurality of stages in the above-described manner. Thus, when the pulverized product of the porous gel material is applied to optical members and the like, the appearance can be favorable. Further, when the pulverized product of the porous gel material is subjected to a classification treatment, the appearance can be further favorable.

The proportion of the pulverized products in the solvent containing the pulverized products after the gel pulverization step and the optional classification step is not limited to particular proportions and may satisfy, for example, the above-described conditions for the gel pulverized product-containing liquid according to the present invention. The proportion can be, for example, in the conditions of the solvent itself containing the pulverized products after the gel pulverization step or in the conditions adjusted after the gel pulverization step and before the use of the solvent as the gel pulverized product-containing liquid.

In the manner as described above, a liquid (e.g., a suspension) containing the microporous particles (pulverized products of a gelled compound) can be produced. By further adding a catalyst for chemically bonding the microporous particles after or during the preparation of the liquid containing the microporous particles, it is possible to prepare a liquid containing the microporous particles and the catalyst. The amount of the catalyst to be added is not limited to particular values, and is, for example 0.01 to 20 wt %, 0.05 to 10 wt %, or 0.1 to 5 wt % relative to the weight of the pulverized products of the gelled silicon compound. The catalyst may be, for example, a catalyst that promotes crosslinking of the microporous particles. The chemical reaction for chemically bonding the microporous particles to each other preferably is a reaction utilizing a dehydration condensation reaction of residual silanol groups contained in silica sol molecules. By promoting the reaction between the hydroxyl groups in the silanol groups by the catalyst, the void-containing structure can be cured in a short time, so that continuous film formation becomes possible. The catalyst may be a photoactive catalyst or a thermoactive catalyst, for example. With the use of the photoactive catalyst, in the void-containing layer forming step, the microporous particles can be bonded (e.g., crosslinked) to each other without heating, for example. Accordingly, the shrinkage of the entire void-containing layer is less liable to occur in the void-containing layer forming step, so that it is possible to maintain a higher void fraction, for example. In addition to or instead of the catalyst, a substance that generates a catalyst (catalyst generator) may be used. For example, in addition to or instead of the photoactive catalyst, a substance that generates a catalyst when subjected to light irradiation (photocatalyst generator) may be used, and in addition to or instead of the thermoactive catalyst, a substance that generates a catalyst when heated (thermal catalyst generator) may be used. The photocatalyst generator is not particularly limited, and may be, for example, a photobase generator (a substance that generates a basic catalyst when subjected to light irradiation) or a photoacid generator (a substance that generates an acidic catalyst when subjected to light irradiation). Examples of the photobase generator include 9-anthrylmethyl N,N-diethylcarbamate (trade name: WPBG-018), (E)-1-[3-(2-hydroxyphenyl)-2-propenoyl]piperidine (trade name: WPBG-027), 1-(anthraquinon-2-yl)ethyl imidazolecarboxylate (trade name: WPBG-140), 2-nitrophenylmethyl 4-methacryloyloxypiperidine-1-carboxylate (trade name: WPBG-165), 1,2-diisopropyl-3-[bis(dimethylamino)methylene]guanidium 2-(3-benzoylphenyl)propionate (trade name: WPBG-266), 1,2-dicyclohexyl-4,4,5,5-tetramethyl-biguanidium n-butyltriphenylborate (trade name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (trade name: HDPD-PB100, manufactured by Heraeus). Note here that the above products with the trade names including "WPBG" are all manufactured by Wako Pure Chemical Industries, Ltd. Examples of the photoacid generator include aromatic sulfonium salt (trade name: SP-170, manufactured by ADEKA), triarylsulfonium salt (trade name: CPI101A, manufactured by San-Apro Ltd.), and aromatic iodonium salt (trade name: Irgacure 250, manufactured by Ciba Japan). The catalyst for chemically bonding the microporous particles to each other is not limited to the photoactive catalyst and the photocatalyst generator, and may be a thermoactive catalyst or a thermal catalyst generator, for example. Examples of the catalyst for chemically bonding the microporous particles to each other include: base catalysts such as potassium hydroxide, sodium hydroxide, and ammonium hydroxide; and acid catalysts such as a hydrochloric acid, an acetic acid, and an oxalic acid. Among them, the base catalysts are preferable. The catalyst or the catalyst generator for chemically bonding the microporous particles to each other can be used by adding it to a sol particle liquid (e.g., suspension) containing the pulverized products (microporous particles) immediately before coating the sol particle liquid, or can be used in the form of a mixture with a solvent, for example. The mixture may be, for example, a coating solution obtained by adding the catalyst directly to and dissolving the catalyst in the sol particle liquid, a solution obtained by dissolving the catalyst or the catalyst generator in a solvent, or a dispersion obtained by dispersing the catalyst or the catalyst generator in a solvent. The solvent is not limited to particular solvents, and examples thereof include various organic solvents, water, and buffer solutions.

(2-3. Methods for Producing Low Refractive Index Layer and Producing Optical Sheet for a Light Guide Plate Type Liquid Crystal Display)

The methods for producing low refractive index layer and producing optical sheet for a light guide plate type liquid crystal display according to the present invention will be described below with reference to illustrative examples. The methods will be described below mainly with reference to a case where the low refractive index layer according to the present invention is a porous silicone material formed of a silicon compound. The low refractive index layer according to the present invention, however, is not limited only to a porous silicone material. Regarding the case where the low refractive index layer according to the present invention is other than a porous silicone material, reference can be made to the following description unless otherwise stated.

The low refractive index layer production method according to the present invention includes, for example, the steps of forming a low refractive index layer precursor using the gel pulverized product-containing liquid according to the present invention and chemically bonding the pulverized products of the gel pulverized product-containing liquid contained in the precursor. The precursor may be referred to as a coating film, for example.

According to the low refractive index layer production method according to the present invention, for example, a porous structure having the same function as an air layer is formed. The reason for this is speculated as follows, for example. The present invention, however, is not limited by this speculation. The reason will be described below with reference to a case where the low refractive index layer according to the present invention is a porous silicone material.

The gel pulverized product-containing liquid according to the present invention used in the method for producing the porous silicone material contains pulverized products of the silicon compound gel. Thus, the three-dimensional structure of the gelled silica compound is dispersed in three-dimensional basic structures of the pulverized products. Thus, in the method for producing the porous silicone material, when the precursor (e.g., coating film) is formed using the gel pulverized product-containing liquid, the three-dimensional basic structures are deposited, and the void-containing structure based on the three-dimensional basic structures are formed, for example. That is, according to the method for producing a porous silicone material, a new porous structure different from that of the silicon compound gel is formed of the pulverized products having the three-dimensional basic structures. Moreover, in the method for producing a porous silicone material, the pulverized products are chemically bonded to each other, whereby the new three-dimensional structure is immobilized. Thus, even though the porous silicone material to be obtained by the method for producing the silicone porous material has a structure with void spaces, it can maintain a sufficient strength and sufficient flexibility. The low refractive index layer (e.g., porous silicone material) obtained by the present invention can be used as a member utilizing void spaces in a wide range of products such as heat insulating materials, sound absorbing materials, optical members, ink-receiving layers, and the like, for example. Furthermore, a laminate film having various functions imparted therein can be produced using the low refractive index layer.

Regarding the low refractive index layer production method according to the present invention, reference can be made to the description as to the gel pulverized product-containing liquid according to the present invention unless otherwise stated.

In the precursor forming step of forming a porous material precursor, the gel pulverized product-containing liquid according to the present invention is coated on the base, for example. By coating the gel pulverized product-containing liquid according to the present invention onto, for example, a base, drying the coating film, and thereafter chemically bonding (e.g., crosslinking) pulverized products in the bonding step, for example, a low refractive index layer having a film strength at a certain level or higher can be formed continuously.

The amount of the gel pulverized product-containing liquid to be coated onto the base is not limited to particular values, and can be set as appropriate depending on, for example, a desired thickness of the low refractive index layer according to the present invention. As a specific example, when the porous silicone material having a thickness from 0.1 µm to 1000 µm is to be formed, the amount of the gel pulverized product-containing liquid to be coated onto the base is, for example, in the range from 0.01 to 60000 µg, 0.1 to 6000 µg, or 1 to 50 µg per square meter of the base. It is difficult to uniquely define a preferable amount of the gel pulverized product-containing liquid to be coated, because it may be affected by the concentration of the liquid, the coating method, etc., for example. However, in terms of productivity, it is preferable to make a coating layer as thin as possible. When the coating amount is too large, for example, it is likely that the solvent may be dried in a drying oven before it volatilizes. If the solvent is dried before the void-containing structure is formed by the sedimentation and deposition of nano-sized pulverized sol particles in the solvent, formation of void spaces may be inhibited to lower the void fraction considerably. On the other hand, when the coating amount is too small, the risk of cissing due to unevenness, variation in hydrophilicity and hydrophobicity, etc. on the surface of the base may increase.

After the gel pulverized product-containing liquid is coated on the base, the porous material precursor (coating film) may be subjected to a drying treatment. The purpose of the drying treatment is not only to remove the solvent in the porous material precursor (the solvent contained in the gel pulverized product-containing liquid) but also to allow the sedimentation and deposition of the sol particles to occur to form a void-containing structure during the drying treatment, for example. The temperature of the drying treatment is from 50° C. to 250° C., from 60° C. to 150° C., or from 70° C. to 130° C., for example, and the time of the drying treatment is from 0.1 to 30 minutes, from 0.2 to 10 minutes, or from 0.3 to 3 minutes, for example. In terms of continuous productivity and realization of high void fraction, it is preferable to set the temperature and the time of the drying treatment lower and shorter, respectively, for example. If the conditions are too stringent, the following problem may arise, for example. That is, when the base is a resin film, for example, the base may extend in a drying oven as the temperature approaches the glass-transition temperature of the base, so that a void-containing structure formed immediately after the coating may have defects such as cracks. On the other hand, when the conditions are too mild, the following problem may arise, for example. That is, the film may contain a residual solvent when it comes out of the drying oven, so that, if the film rubs against a roller in a subsequent step, defects in appearance such as scratches may be caused.

The drying treatment may be natural drying, heat drying, or drying under reduced pressure, for example. The drying method is not particularly limited, and a commonly used heating unit can be used, for example. Examples of the heating unit include a hot air fan, a heating roller, and a far-infrared heater. In particular, from the viewpoint of performing continuous production industrially, heat drying is preferable. It is preferable to use a solvent having a low surface tension for the purpose of inhibiting the shrinkage stress that may occur as the solvent volatizes during the drying process and inhibiting a crack phenomenon in the low refractive index layer (the porous silicone material) caused by the shrinkage stress. Examples of the solvent include, but are not limited to, lower alcohols (typically, isopropyl alcohol [IPA]), hexane, and perfluorohexane.

The base is not limited to particular bases, and for example, a base made of a thermoplastic resin, a base made of glass, an inorganic base plate typified by silicon, a plastic formed of a thermosetting resin, an element such as a semiconductor, or a carbon fiber-based material typified by carbon nanotube can be favorably used. The base, however, is by no means limited thereto. Examples of the form of the base include a film and a plate. Examples of the thermoplastic resin includes polyethylene terephthalate (PET), acrylic resins, cellulose acetate propionate (CAP), cycloolefin polymer (COP), triacetate (TAC), polyethylene naphthalate (PEN), polyethylene (PE), and polypropylene (PP).

In the low refractive index layer production method according to the present invention, the bonding step is a step of chemically bonding the pulverized products contained in the porous material precursor (coating film). By the bonding step, the three-dimensional structures of the pulverized products in the porous material precursor are immobilized, for example. In the case of conventional immobilization by sintering, for example, a treatment at a high temperature of at least 200° C. is performed to induce the dehydration condensation of silanol groups and the formation of siloxane bonds. In the bonding step according to the present invention, various additives that catalyze the above-described dehydration condensation reaction are caused to react with each other. With this configuration, for example, when the base is a resin film, it is possible to continuously form and immobilize the void-containing structure at a relatively low drying temperature of around 100° C. and with a short treatment time of less than several minutes without damaging the base.

The method for achieving the above-described chemical bonding is not particularly limited, and can be determined as appropriate depending on the type of the gel (e.g. silicon compound gel), for example. As a specific example, the chemical bonding can be achieved by chemically crosslinking the pulverized products. Besides this, for example, when inorganic particles such as titanium oxide particles are added to the pulverized products, the inorganic particles and the pulverized products may be chemically bonded by crosslinking. Furthermore, in the case of causing the pulverized products to carry a biocatalyst such as an enzyme, a site of the catalyst other than the catalytic site may be chemically crosslinked with the pulverized products. Therefore, the present invention is not only applicable to a low refractive index layer formed by sol particles bonded to each other, but the applicable range according to the present invention can be expanded to an organic-inorganic hybrid low refractive index layer and a host-guest low refractive index layer, for example. It is to be noted, however, that the applicable range according to the present invention is not limited thereto.

Depending on the type of the gel pulverized product (e.g. silicon compound gel), the bonding step can be carried out by causing a chemical reaction in the presence of a catalyst, for example. The chemical reaction in the present invention preferably is a reaction utilizing a dehydration condensation reaction of residual silanol groups contained in the pulverized products of the silicon compound gel. By promoting the reaction between the hydroxyl groups in the silanol groups by the catalyst, the void-containing structure can be cured in a short time, so that continuous film formation becomes possible. Examples of the catalyst include, but are not limited to, base catalysts such as potassium hydroxide, sodium hydroxide, and ammonium hydroxide and acid catalysts such as a hydrochloric acid, an acetic acid, and an oxalic acid. As a catalyst to be used in the dehydration condensation reaction, a base catalyst is particularly preferable. Also, catalysts that exhibit catalytic activity when irradiated with light (e.g., ultraviolet rays), such as photoacid generation catalysts and photobase generation catalysts can be used preferably. The photoacid generation catalysts and photobase generation catalysts are not particularly limited, and are as mentioned above, for example. As mentioned above, it is preferable to add the catalyst to a sol particle liquid (e.g., suspension) containing the pulverized products immediately before coating the sol particle liquid, or to use the catalyst in the form of a mixture with a solvent, for example. The mixture may be, for example, a coating solution obtained by adding the catalyst directly to and dissolving the catalyst in the sol particle liquid, a solution obtained by dissolving the catalyst in a solvent, or a dispersion obtained by dispersing the catalyst in a solvent. The solvent is not limited to particular solvents, and examples thereof include water and buffer solutions, as mentioned above.

Furthermore, for example, a crosslinking assisting agent for indirectly bonding the pulverized products of the gel may be further added to the gel-containing liquid according to the present invention. This crosslinking assisting agent enters the spaces between the respective particles (the pulverized products), where it interacts with or bonds to the particles. This allows the particles somewhat apart from each other to be bonded to each other. As a result, it becomes possible to efficiently improve the strength. The crosslinking assisting agent preferably is a multi-crosslinking silane monomer. Specifically, the multi-crosslinking silane monomer may have at least two and at most three alkoxysilyl groups, the chain length between the alkoxysilyl groups may be at least one and at most ten carbon atoms, and the multi-crosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis(triethoxysilyl)hexane, bis(trimethoxysilyl)hexane, bis(trimethoxysilyl)-N-butyl-N-propyl-ethane-1,2-diamine, tris-(3-trimethoxysilylpropyl)isocyanurate, and tris-(3-triethoxysilylpropyl)isocyanurate. The amount of the crosslinking assisting agent to be added is not limited to particular values, and is, for example, in the range from 0.01 wt % to 20 wt %, from 0.05 wt % to 15 wt %, or from 0.1 wt % to 10 wt % relative to the weight of the pulverized products of the silicon compound.

The chemical reaction in the presence of the catalyst can be caused by, for example: subjecting the coating film containing the catalyst or the catalyst generator previously added to the gel pulverized product-containing liquid to light irradiation or heating; subjecting the coating film to light irradiation or heating after spraying the catalyst over the coating film; or subjecting the coating film to light irradiation or heating while spraying the catalyst or the catalyst generator over the coating film. When the catalyst is a photoactive catalyst, the porous silicone material can be formed by chemically bonding the microporous particles to each other by light irradiation, for example. When the catalyst is a thermoactive catalyst, the porous silicone material can be formed by chemically bonding the microporous particles to each other by heating. The irradiation dose (energy) in the above irradiation is not limited to particular amounts and is, for example, from 200 to 800 mJ/cm$^2$, from 250 to 600 mJ/cm$^2$, or from 300 to 400 mJ/cm$^2$, in terms of light at a wavelength of 360 nm. The accumulated amount of light preferably is 200 mJ/cm$^2$ or more, from the viewpoint of preventing the problem in that, owing to insufficient irradiation dose, degradation of the catalyst generator by light absorption may not proceed sufficiently, so that the catalyst generator cannot exhibit its effect sufficiently. The accumulated amount of light preferably is 800 mJ/cm$^2$ or less, from the viewpoint of preventing damage to the base disposed under the low refractive index layer so as to prevent the formation of heat wrinkles. The wavelength of light in the irradiation is not limited to particular wavelengths and is, for example, from 200 to 500 nm or from 300 to 450 nm. The irradiation time in the irradiation is not limited to particular times and is, for example, from 0.1 to 30 minutes, from 0.2 to 10 minutes, or from 0.3 to 3 minutes. The conditions for the heat treatment are not limited to particular conditions. The heating temperature is from 50° C. to 250° C., from 60° C. to 150° C., or from 70° C. to 130° C., for example, and the heating time is from 0.1 to 30 minutes, from 0.2 to 10 minutes, or from 0.3 to 3 minutes, for example. It is preferable to use, for example, a solvent having a low surface tension for the purpose of inhibiting the shrinkage stress that may occur as the solvent volatizes during the drying process and inhibiting a crack phenomenon in the low refractive index layer caused by the shrinkage stress. Examples of the solvent include, but are not limited to, lower alcohols typically, isopropyl alcohol (IPA), hexane, and perfluorohexane.

The low refractive index layer (e.g., porous silicone material) according to the present invention can be produced in the above-described manner. The low refractive index layer production method according to the present invention, however, is not limited thereto. The low refractive index layer according to the present invention, which is a porous silicone material, may be referred to as a "silicone porous material according to the present invention" in the description below.

In production of an optical sheet for a light guide plate type liquid crystal display according to the present invention, a pressure-sensitive adhesive/adhesive layer further may be formed on the low refractive index layer according to the present invention (pressure-sensitive adhesive/adhesive layer forming step) as mentioned above. Specifically, the pressure-sensitive adhesive/adhesive layer may be formed by applying (coating) a pressure-sensitive adhesive or an adhesive to the low refractive index layer according to the present invention, for example. Alternatively, the pressure-sensitive adhesive/adhesive layer may be formed on the low refractive index layer according to the present invention by adhering, e.g., an adhesive tape including a base and the pressure-sensitive adhesive/adhesive layer laminated on the base to the low refractive index layer with the pressure-sensitive adhesive/adhesive layer side of the adhesive tape facing the low refractive index layer. In this case, the base of the adhesive tape may be left on the adhesive tape or may be peeled off from the pressure-sensitive adhesive/adhesive layer. In particular, as mentioned above, by peeling off the base from the low refractive index layer to form a baseless optical sheet for a light guide plate type liquid crystal display (having no base), the thickness of the sheet can be significantly reduced and the increase in the thickness of the device or the like can be prevented. In the present invention, the terms "pressure-sensitive adhesive" and "pressure-sensitive adhesive layer" respectively refer to an agent and a layer that adhere a substance in a peelable manner, for example. In the present invention, the terms "adhesive" and "adhesive layer" respectively refer to an agent and a layer that adhere a substance in a non-peelable manner, for example. It is to be noted, however, that, in the present invention, the "pressure-sensitive adhesive" and the "adhesive" are not always clearly distinguishable from each other, and also, the "pressure-sensitive adhesive layer" and the "adhesive layer" are not always clearly distinguishable from each other. In the present invention, a pressure-sensitive adhesive or an adhesive for forming the pressure-sensitive adhesive/adhesive layer is not limited to particular adhesives, and a commonly used pressure-sensitive adhesive or adhesive can be used, for example. Examples of the pressure-sensitive adhesive or the adhesive include: polymer adhesives such as acrylic adhesives, vinyl alcohol adhesives, silicone adhesives, polyester adhesives, polyurethane adhesives, and polyether adhesives; and rubber adhesives. Further, the pressure-sensitive adhesive and the adhesive may be an adhesive composed of a water-soluble crosslinking agent of a vinyl alcohol polymer such as glutaraldehyde, melamine, or an oxalic acid. Only one type of pressure-sensitive adhesive or adhesive may be used, or two or more types of pressure-sensitive adhesives or adhesives may be used in combination (e.g., they may be mixed together or may be laminated). As mentioned above, the low refractive index layer can be protected from physical damage (particularly abrasion) by the pressure-sensitive adhesive/adhesive layer. It is preferable that the pressure-sensitive adhesive/adhesive layer has excellent pressure resistance so that the low refractive index layer does not collapse even used as a (baseless) optical sheet for a light guide plate type liquid crystal display having no base. The pressure-sensitive adhesive/adhesive layer, however, is not limited thereto. The thickness of the pressure-sensitive adhesive/adhesive layer is not limited to particular values and is, for example, from 0.1 to 100 μm, from 5 to 50 μm, from 10 to 30 μm, or from 12 to 25 μm.

The low refractive index layer according to the present invention obtained in this manner may be further laminated on each of the first optical film and the second optical film to form an optical sheet for a light guide plate type liquid crystal display according to the present invention. In this case, as mentioned above, the low refractive index layer may be laminated on each of the first optical film and the second optical film via the pressure-sensitive adhesive/adhesive layer (pressure-sensitive adhesive or adhesive).

The respective components in the optical sheet for a light guide plate type liquid crystal display according to the present invention may be laminated by continuous processing using a long film (e.g., the so-called "roll-to-roll" process) in terms of efficiency, for example. When the base is a molded product, an element, or the like, the components that have been subjected to batch processing may be laminated on the base.

The following describes the methods for producing the low refractive index layer and the optical sheet for a light guide plate type liquid crystal display according to the present invention using a transfer resin film base (hereinafter, also referred to simply as a "base") by way of examples with reference to FIGS. 3 to 5. The illustrated production method is merely an example, and the present invention is not limited thereto.

Figure 3:
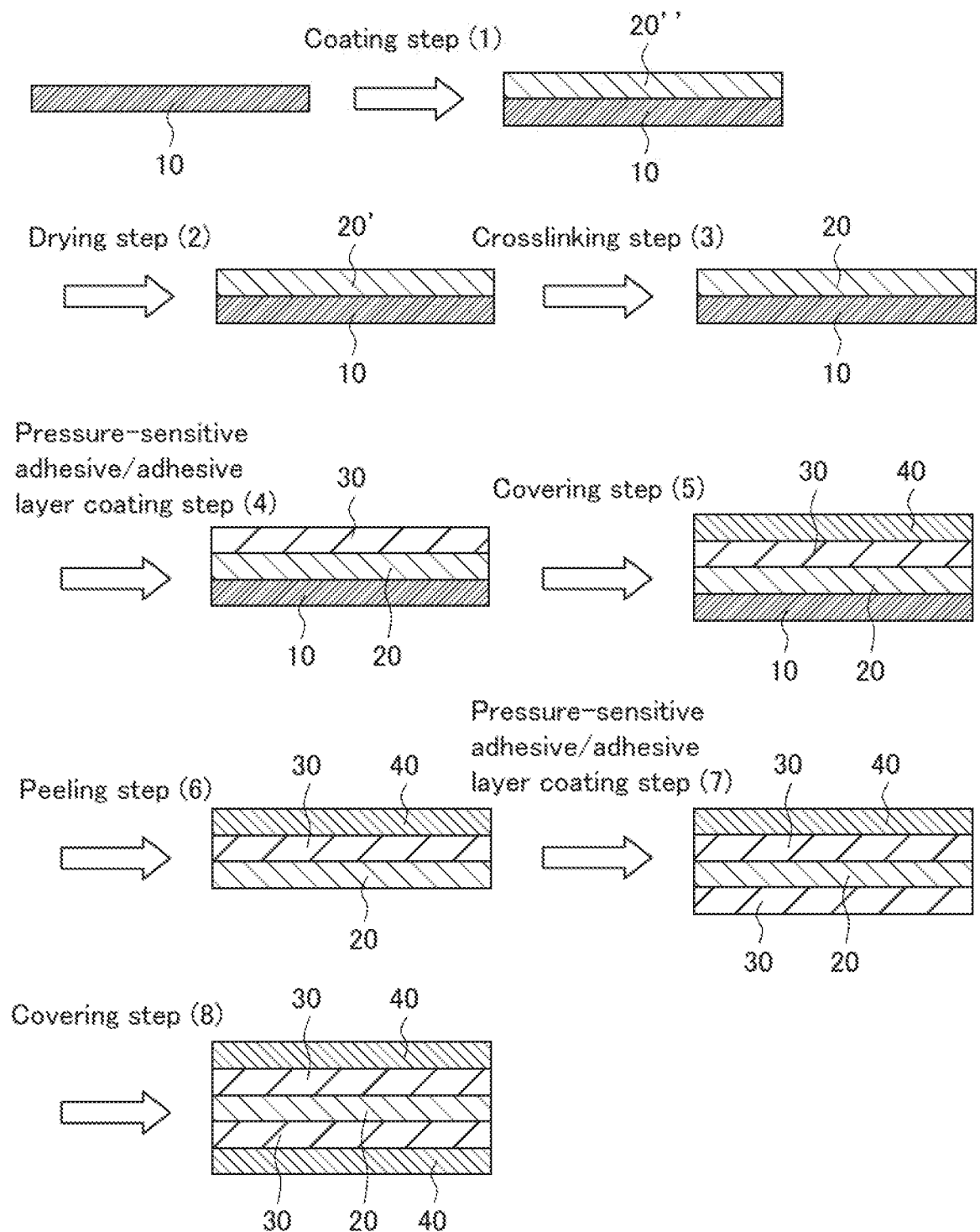
FIG. 3 is a step cross-sectional view schematically illustrating an example method for producing the optical sheet for a light guide plate type liquid crystal display according to the present invention.

Example steps in production of the low refractive index layer and the optical sheet for a light guide plate type liquid crystal display according to the present invention using the base are schematically shown in the cross-sectional view of FIG. 3. In FIG. 3, the method for forming a low refractive index layer includes: a coating step (1) of coating a gel pulverized product-containing liquid 20" according to the present invention containing pulverized products of a gelled compound onto a base 10; a coating film forming step (drying step) (2) of drying the gel pulverized product-containing liquid 20" to form a coating film 20', which is a precursor layer of a low refractive index layer; and a chemical treatment step (e.g., crosslinking treatment step) (3) of subjecting the coating film 20' to a chemical treatment (e.g., crosslinking treatment) to form a low refractive index layer 20. In the above-described manner, as shown in FIG. 3, the low refractive index layer 20 can be formed using the base 10. The method for forming the low refractive index layer may include any step besides the steps (1) to (3) as appropriate, or may not include any step other than the steps (1) to (3). Further, as shown in FIG. 3, an optical sheet for a light guide plate type liquid crystal display, including a laminate in which the pressure-sensitive adhesive/adhesive layer 30 is directly laminated on one or both surfaces of the low refractive index layer 20 can be produced by performing a pressure-sensitive adhesive/adhesive layer coating step (4) of coating the pressure-sensitive adhesive/adhesive layer 30 onto the surface of the low refractive index layer 20 remote from the substrate 10, a covering step (5) of covering the pressure-sensitive adhesive/adhesive layer 30 with an optical film 40, a peeling step (6) of peeling off the substrate 10 from the low refractive index layer 20 to remove, a pressure-sensitive adhesive/adhesive layer coating step (7) of coating another pressure-sensitive adhesive/adhesive layer 30 onto the surface of the low refractive index layer 20 from which the base 10 has been peeled off, and a covering step (8) of covering another pressure-sensitive adhesive/adhesive layer 30 with another optical film 40. It can be said that either one of the optical films 40 corresponds to the first optical film, and the other corresponds to the second optical film. The pressure-sensitive adhesive/adhesive layer 30 that adheres the first optical film and the low refractive index layer 20 can be said to be the first pressure-sensitive adhesive/adhesive layer. The pressure-sensitive adhesive/adhesive layer 30 that adheres the second optical film and the low refractive index layer 20 can be said to be the second pressure-sensitive adhesive/adhesive layer. Although FIG. 3 shows a process in which the pressure-sensitive adhesive/adhesive layer coating step (4) and the covering step (5) are performed separately, the pressure-sensitive adhesive/adhesive layer coating step (4) and the covering step (5) may be performed simultaneously by attaching a pressure-sensitive adhesive/adhesive layer 30 to which the optical film 40 has been applied beforehand (e.g., an adhesive tape in which the optical film 40 and the pressure-sensitive adhesive/adhesive layer 30 are integrated) to the low refractive index layer 20. The same applies to the pressure-sensitive adhesive/adhesive layer coating step (7) and the covering step (8). The method for forming an optical sheet for a light guide plate type liquid crystal display may include any step besides the steps (1) to (8) as appropriate, or may not include any step other than the steps (1) to (8). Moreover, for example, in FIG. 3, a separator instead of the optical film 40 may be adhered to protect the pressure-sensitive adhesive/adhesive layer 30. For example, the separator protecting the pressure-sensitive adhesive/adhesive layer 30 is peeled off, and the first optical film or the second optical film may thereafter be adhered to the pressure-sensitive adhesive/adhesive layer 30 to produce an optical sheet for a light guide plate type liquid crystal display according to the present invention. For example, the base 10 is not used in FIG. 3, the first optical film or the second optical film 40 instead of the base 10 may be directly subjected to the steps (1) to (3) to form a low refractive index layer. In this case, the optical film 40 used instead of the base 10 and the low refractive index layer 20 are directly laminated on each other without the pressure-sensitive adhesive/adhesive layer 30.

In the coating step (1), the method for coating the gel pulverized product-containing liquid 20" is not particularly limited, and a commonly used coating method can be employed. Examples of the coating method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, etc., the extrusion coating method, the curtain coating method, the roller coating method, and the micro-gravure coating method are preferable. The coating amount of the gel pulverized product-containing liquid 20" is not limited to particular values, and can be set as appropriate so that the porous structure (low refractive index layer) 20 having a suitable thickness is obtained, for example. The thickness of the porous structure (low refractive index layer) 20 is not limited to particular values, and is as described above, for example.

In the drying step (2), the gel pulverized product-containing liquid 20" is dried (i.e., a dispersion medium contained in the gel pulverized product-containing liquid 20" is removed) to form the coating film (precursor layer) 20'. The conditions for the drying treatment are not particularly limited, and may be as described above.

In the chemical treatment step (3), the coating film 20' containing a catalyst (e.g., a photoactive catalyst, a photocatalyst generator, thermoactive catalyst, or a thermal catalyst generator) added prior to the coating step is irradiated with light or heated, whereby the pulverized products in the coating film (precursor layer) 20' are chemically bonded (e.g., crosslinked) to each other. As a result, the low refractive index layer 20 is formed. The conditions for the light irradiation and heating in the chemical treatment step (3) are not particularly limited, and may be as described above.

Figure 4:
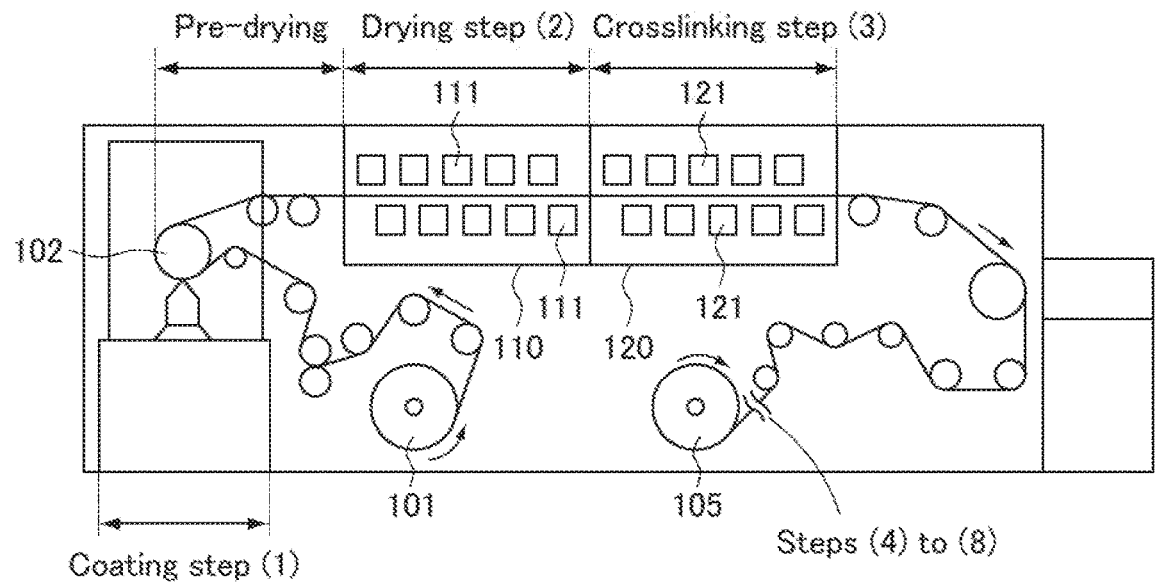
FIG. 4 is a drawing schematically illustrating some of steps and an example device used in the method for producing the optical sheet for a light guide plate type liquid crystal display according to the present invention.

FIG. 4 schematically shows an example of a slot die coating apparatus and the method for forming a low refractive index layer using the same. While FIG. 4 is a cross-sectional view, hatching is omitted for the sake of clarity.

As shown in FIG. 4, the respective steps in the method using this apparatus are performed while conveying a base 10 in one direction by rollers. The conveyance speed is not limited to particular speeds, and is, for example, from 1 to 100 m/min, from 3 to 50 m/min, or from 5 to 30 m/min.

First, while feeding and conveying the base 10 from a delivery roller 101, a coating step (1) of coating a gel pulverized product-containing liquid 20" according to the present invention onto the base is performed on a coating roller 102. Subsequently, in an oven zone 110, a drying step (2) is performed. In the coating apparatus shown in FIG. 4, a pre-drying step is performed after the coating step (1) and prior to the drying step (2). The pre-drying step can be performed at room temperature without heating. In the drying step (2), heating units 111 are used. As the heating unit 111, a hot air fan, a heating roll, a far-infrared heater, or the like can be used as appropriate, as mentioned above. Also, for example, the drying step (2) may be divided into two or more steps, and the drying temperatures in the respective steps may be set so that the drying temperature in the first step increases toward the step(s) subsequent thereto.

After the drying step (2), a chemical treatment step (3) is performed in a chemical treatment zone 120. In the chemical treatment step (3), when a coating film 20' after being dried contains a photoactive catalyst, for example, the coating film 20' is irradiated with light emitted from lamps (light irradiation units) 121 disposed above and below the base 10. On the other hand, when the coating film 20' after being dried contains a thermoactive catalyst, for example, hot air fans (heating units) are used instead of the lamps (light irradiation units) 121, and the base 10 is heated using the hot air fans 121 disposed above and below the base 10. By this crosslinking treatment, pulverized products in the coating film 20' are chemically bonded to each other, whereby a low refractive index layer 20 is cured and strengthened. Further, although it is not shown, the steps (4) to (8) of FIG. 3 can be performed by a Roll to Roll method to produce the optical sheet for a light guide plate type liquid crystal display. Thereafter, the produced optical sheet for a light guide plate type liquid crystal display is wound up by a winding roller 105.

Figure 5:
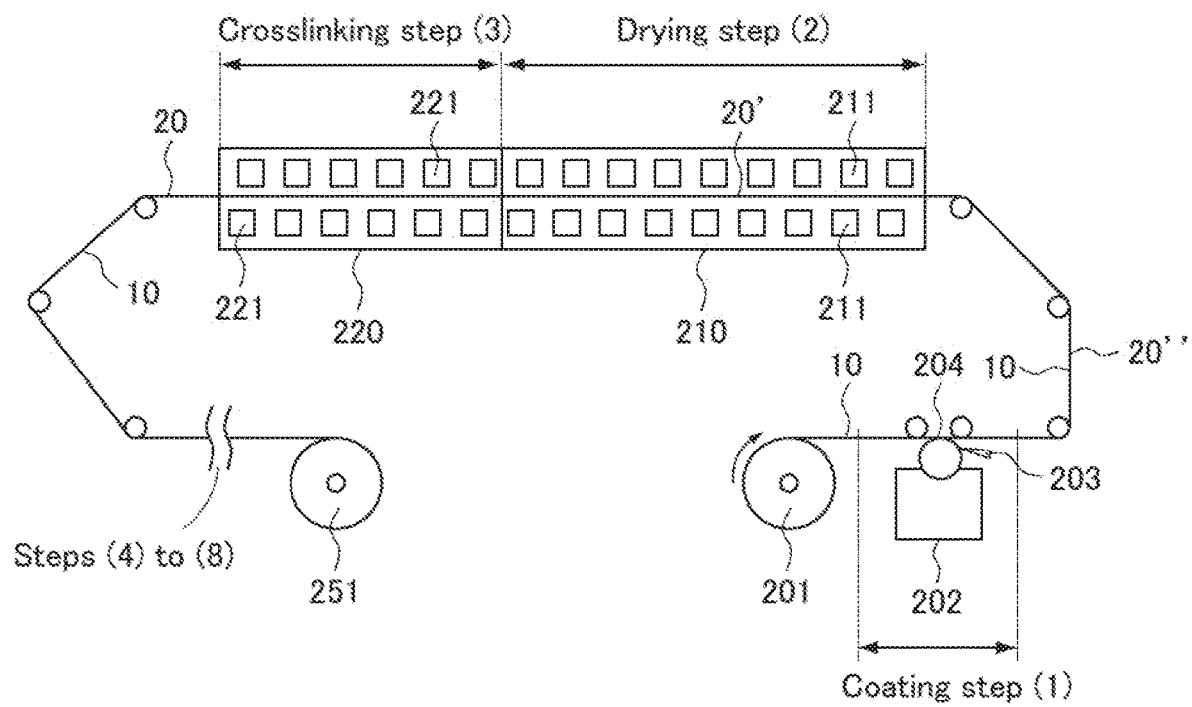
FIG. 5 is a drawing schematically illustrating some of steps and another example device used in the method for producing the optical sheet for a light guide plate type liquid crystal display according to the present invention.

FIG. 5 schematically shows an example of a coating apparatus for a micro-gravure method (micro-gravure coating method) and the method for forming a porous structure using the same. While FIG. 5 is a cross-sectional view, hatching is omitted for the sake of clarity.

As shown in FIG. 5, the respective steps in the method using this apparatus are performed while conveying a base 10 in one direction by rollers, as in the example shown in FIG. 4. The conveyance speed is not limited to particular speeds, and is, for example, from 1 to 100 m/min, from 3 to 50 m/min, or from 5 to 30 m/min.

First, while feeding and conveying the base 10 from a delivery roller 201, a coating step (1) of coating a gel pulverized product-containing liquid 20" according to the present invention onto the base 10 is performed. As shown in FIG. 3, the gel pulverized product-containing liquid 20" is coated using a liquid reservoir 202, a doctor (doctor knife) 203, and a micro-gravure coater 204. Specifically, the gel pulverized product-containing liquid 20" in the liquid reservoir 202 is caused to be carried on the surface of the micro-gravure coater 204, and is then coated on the surface of the base 10 with the micro-gravure coater 204 while controlling the thickness of the coating film of the gel pulverized product-containing liquid 20" to a predetermined thickness with the doctor 203. It is to be noted here that the micro-gravure coater 204 merely is an example of a coating unit. The coating unit is not limited to the micro-gravure coater 204, and any coating unit may be employed.

Next, a drying step (2) is performed. Specifically, as shown in FIG. 3, the base 10 having the gel pulverized product-containing liquid 20" coated thereon is conveyed to an oven zone 210. The gel pulverized product-containing liquid 20" is dried by being heated with heating units 211 disposed in the oven zone 210. The heating units 211 may be the same as those in FIG. 4, for example. The drying step (2) may be divided into a plurality of steps by dividing the oven zone 210 into a plurality of sections, for example. The drying temperatures in the respective steps may be set so that the drying temperature in the first step increases toward the step(s) subsequent thereto. After the drying step (2), a chemical treatment step (3) is performed in a chemical treatment zone 220. In the chemical treatment step (3), when a coating film 20' after being dried contains a photoactive catalyst, for example, the coating film 20' is irradiated with light emitted from lamps (light irradiation units) 221 disposed above and below the base 10. On the other hand, when the coating film 20' after being dried contains a thermoactive catalyst, for example, hot air fans (heating units) are used instead of the lamps (light irradiation units) 221, and the base 10 is heated using the hot air fans 221 disposed below the base 10. By this crosslinking treatment, pulverized products in the coating film 20' are chemically bonded to each other, whereby a low refractive index layer 20 is formed.

Further, although it is not shown, the steps (4) to (8) of FIG. 3 can be performed by a Roll to Roll method to produce the optical sheet for a light guide plate type liquid crystal display. Thereafter, the produced optical sheet for a light guide plate type liquid crystal display is wound up by a winding roller 251.

[3. Void-Containing Layer]

The case where the low refractive index layer according to the present invention is a void-containing layer (void-containing layer according to the present invention) will be described below with reference to illustrative examples.

The void-containing layer according to the present invention may have, for example, a void fraction of 35 vol % or more and a peak pore diameter of 50 nm or less. However, this merely is an example, and the void-containing layer according to the present invention is not limited thereto.

The void fraction may be, for example, 35 vol % or more, 38 vol % or more, or 40 vol % or more, and 90 vol % or less, 80 vol % or less, or 75 vol % or less. The void-containing layer according to the present invention may be, for example, a highly void-containing layer having a void fraction of 60 vol % or more.

The void fraction can be measured, for example, by the following measurement method.

(Method for Measuring Void Fraction)

If the layer whose void fraction is to be measured is a single layer containing void spaces, the ratio (volume ratio) between the component of the layer and the air can be calculated by a standard method (for example, weight and volume are measured to calculate the density), whereby the void fraction (vol %) can be calculated. Further, since the refractive index and the void fraction have a correlation, the void fraction can be calculated from the value of the refractive index as a layer, for example. Specifically, for example, the void fraction is calculated according to the Lorentz Lorenz's formula from the value of the refractive index measured by an ellipsometer.

The void-containing layer according to the present invention can be produced, for example, by chemical bonding of gel pulverized products (microporous particles) as mentioned above. In this case, the void spaces of the void-containing layer can be divided into three types (1) to (3) below for convenience.

(1) Void spaces contained in raw material gel itself (inside the particles)

(2) Void spaces contained in gel pulverized product unit (3) Void spaces between gel pulverized products created by deposition of gel pulverized products The void spaces (2) are void spaces formed during pulverization, which are different from the voids (1) that can be formed in each block when each particle group generated by pulverizing the gel is regarded as one mass (block) regardless of the size or the like of the gel pulverized product (microporous particle). The void spaces (3) are void spaces created because of irregularity in the sizes or the like of the gel pulverized products (microporous particles) in pulverization (e.g., media-less pulverization). The void-containing layer according to the present invention contains the void spaces (1) to (3), whereby an appropriate void fraction and peak pore diameter can be achieved, for example.

The peak pore diameter may be, for example, 5 nm or more, 10 nm or more, or 20 nm or more, and 50 nm or less, 40 nm or less, or 30 nm or less. In the void-containing layer, if the peak pore diameter is too large in a state where the void fraction is high, light is scattered, which makes the void-containing layer opaque. Further, in the present invention, the lower limit of the peak pore diameter of the void-containing layer is not particularly limited to particular values, but it is preferable that the peak pore diameter is not too small because it is difficult to increase the void fraction if the peak pore diameter be too small. In the present invention, the peak pore diameter can be measured, for example, by the following method.

(Method for Measuring Peak Pore Diameter)

The peak pore diameter is calculated from the results of the BJH plot and the BET plot by nitrogen adsorption and the isothermal adsorption line using a pore distribution/specific surface area analyzer (trade name: BELLSORP MINI, MicrotracBEL Corp.).

The thickness of the void-containing layer according to the present invention is not limited to particular values, and may be, for example, 100 nm or more, 200 nm or more, or 300 nm or more, and 10000 nm or less, 5000 nm or less, or 2000 nm or less.

In the void-containing layer according to the present invention, for example, an abrasion resistance of the low refractive index layer measured with BEMCOT® and indicating a film strength is from 60% to 100%, and a folding endurance of the low refractive index layer measured by an MIT test and indicating a flexibility is 100 times or more, although it is not limited thereto.

The void-containing layer according to the present invention uses pulverized products of the porous gel material, for example. Thus, the three-dimensional structure of the porous gel material is destroyed, whereby a new three-dimensional structure different from that of the porous gel material is formed. As described above, the void-containing layer according to the present invention becomes a layer having a new pore structure (new void-containing structure) that cannot be obtained in a layer formed using the porous gel material. That is, a nano-scale void-containing layer having a high void fraction can be formed. Moreover, for example, when the void-containing layer according to the present invention is a porous silicone material, the pulverized products in the void-containing layer are chemically bonded to each other while adjusting the number of functional groups having siloxane bonds of the silicon compound gel, for example. Furthermore, a new three-dimensional structure is formed as a void-containing layer precursor, and pulverized products are thereafter bonded chemically (e.g., crosslinked) to each other in the bonding step. Thus, when the void-containing layer according to the present invention is a void-containing layer, the void-containing layer has a structure with void spaces, for example. However, it can maintain a sufficient strength and sufficient flexibility. Therefore, according to the present invention, the void-containing layer can be easily and simply applied to various objects.

For example, the void-containing layer according to the present invention includes pulverized products of a porous gel material as mentioned above, and the pulverized products are chemically bonded to each other. In the void-containing layer according to the present invention, the form of the chemical bonding (chemical bonds) between the pulverized products is not limited to particular forms. Specifically, the chemical bonds may be crosslinking bonds, for example. The method for chemically bonding the pulverized products to each other is as described in detail for, for example, the method for producing the void-containing layer described above.

The crosslinking bonds are siloxane bonds, for example. Examples of the siloxane bonds include T2, T3, and T4 bonds shown below. When the porous silicone material according to the present invention includes siloxane bonds, the porous silicone material may include any one of the T2, T3, and T4 bonds, any two of them, or all three of them, for example. As the proportions of T2 and T3 among the siloxane bonds become higher, the porous silicone material becomes more flexible, so that it is expected that the porous silicone material exhibits characteristics intrinsic to the gel. However, the film strength of the porous silicone material is deteriorated. However, the film strength of the porous silicone material is deteriorated. When the proportion of T4 in the siloxane bonds becomes higher, a film strength is more likely to be obtained, whereas void spaces become smaller, resulting in deteriorated flexibility. Thus, it is preferable to adjust the proportions of T2, T3, and T4 depending on the intended use of the porous silicone material, for example.

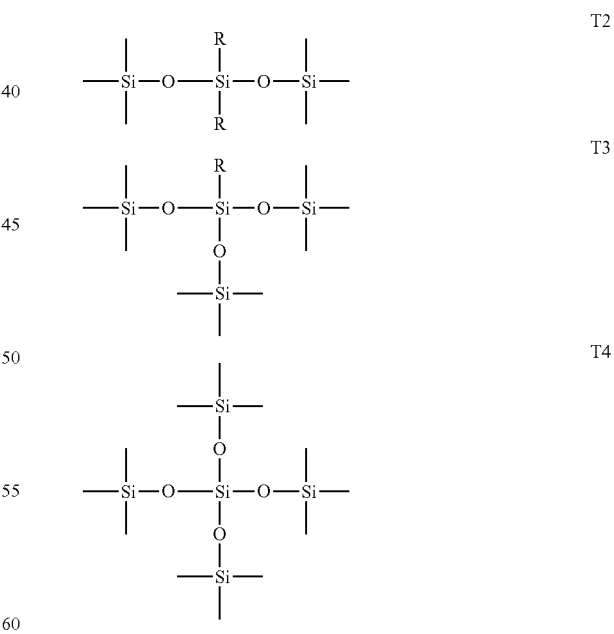

In the case where the void-containing layer according to the present invention includes the siloxane bonds, the ratio of T2, T3, and T4 expressed relatively assuming that the proportion of T2 is "1" is as follows, for example: T2:T3:T4=1:[1 to 100]:[0 to 50], 1:[1 to 80]:[1 to 40], or 1:[5 to 60]:[1 to 30].

It is preferable that silicon atoms contained in the void-containing layer according to the present invention be bonded to each other through siloxane bonds, for example. As a specific example, the proportion of unbonded silicon atoms (i.e., residual silanol) among all the silicon atoms contained in the porous silicone material is less than 50%, 30% or less, or 15% or less, for example.

The void-containing layer according to the present invention has a pore structure, and the size of each void space in the pore structure indicates, out of the diameter of the long axis and the diameter of the short axis of the void space (pore), the diameter of the long axis. The size of the void space (pore) is from 5 nm to 50 nm, for example. The lower limit of the size is, for example, 5 nm or more, 10 nm or more, or 20 nm or more. The upper limit of the size is, for example, 50 nm or less, 40 nm or less, or 30 nm or less. The range of the size is, for example, from 5 nm to 50 nm or from 10 nm to 40 nm. A preferable size of the void spaces is determined depending on the use of the void-containing structure. Thus, it is necessary to adjust the size of the void spaces to a desired value according to the intended use, for example. The size of the void spaces can be evaluated in the following manner, for example.

(SEM Observation of Cross Section of Void-Containing Layer)

In the present invention, the void-containing layer can be observed and analyzed using a scanning electron microscopy (SEM). Specifically, for example, the void-containing layer is subjected to FIB processing (acceleration voltage: 30 kV) while being cooled, and the cross-sectional electronic image of the obtained cross-sectional sample can be obtained by FIB-SEM (trade name: Helios NanoLab 600, manufactured by FEI Company, acceleration voltage: 1 kV) at an observing magnification of 100000×.

(Evaluation of Size of Void Spaces)

In the present invention, the size of the void spaces can be quantified according to the BET test. Specifically, 0.1 g of a sample (the void-containing layer according to the present invention) is set in a capillary tube of a pore distribution/specific surface area measurement apparatus (trade name: BELLSORP MIN, manufactured by MicrotracBEL Corp.), and dried under reduced pressure at room temperature for 24 hours to remove gas in the void-containing structure. Then, a BET plot, a BJH plot, and an adsorption isotherm are created by causing the sample to adsorb nitrogen gas, whereby the pore distribution is determined. On the basis of the thus-determined pore distribution, the size of the void spaces can be evaluated.

The abrasion resistance of the void-containing layer according to the present invention measured with BEMCOT® and indicating the film strength is from 60% to 100%, for example. With the film strength in the above-described range, the void-containing layer according to the present invention has excellent abrasion resistance in various processes, for example. The void-containing layer according to the present invention has scratch resistance during a winding operation after production and handling of the produced void-containing layer in production processes, for example. In addition, for example, the void-containing layer according to the present invention can increase the particle sizes of pulverized products of the silicon compound gel and a bonding force in the neck portion where pulverized products are bonded, utilizing a catalyst reaction in a heating process to be described below, instead of reducing a void fraction. Accordingly, the void-containing layer according to the present invention can provide a certain level of strength to a void-containing structure which is originally weak, for example.

The lower limit of the abrasion resistance is, for example, 60% or more, 80% or more, or 90% or more. The upper limit of the abrasion resistance is, for example, 100% or less, 99% or less, or 98% or less. The range of the abrasion resistance is, for example, from 60% to 100%, from 80% to 99%, or from 90% to 98%.

The abrasion resistance can be measured in the following manner, for example.

(Evaluation of Abrasion Resistance)

(1) From a void-containing layer (the void-containing layer according to the present invention) formed on an acrylic film by coating, a circular cut piece with a diameter of about 15 mm is cut out as a sample.

(2) Next, regarding the sample, the coating amount of Si ($Si_0$) is measured by identifying silicon using an X-ray fluorescence spectrometer (ZSX Primus II, manufactured by Shimadzu Corporation). Next, a cut piece with a size of 50 mm×100 mm is cut out from the void-containing layer on the acrylic film. This cut piece is cut out from a vicinity of the site where the circular cut piece was obtained. The obtained cut piece is fixed onto a glass plate (thickness: 3 mm), and a sliding test is performed using BEMCOT®. The sliding conditions are as follows: weight: 100 g, reciprocation: 10 times.

(3) Regarding the void-containing layer having been subjected to the sliding, the sampling and the X-ray fluorescence measurement are performed in the same manner as in the above item (1) to measure the residual amount of Si ($Si_1$) after the abrasion test. The abrasion resistance is defined as the residual ratio of Si (%) before and after the sliding test performed using the BEMCOT®, and is represented by the following formula.

Abrasion resistance (%)=[the residual amount of Si ($Si_1$)/the coating amount of Si ($Si_0$)]×100(%)

The folding endurance of the void-containing layer according to the present invention measured by the MIT test and indicating the flexibility is, for example, 100 times or more. With the flexibility in the above-described range, for example, the low refractive index layer according to the present invention exhibits excellent handleability during a winding operation in a production process and in use, for example.

The lower limit of the folding endurance is, for example, 100 times or more, 500 times or more, or 1000 times or more. The upper limit of the folding endurance is not limited to particular values, and is, for example, 10000 times or less. The range of the folding endurance is, for example, from 100 to 10000 times, from 500 to 10000 times, or from 1000 to 10000 times.

The term "flexibility" means the deformability of a substance, for example. The folding endurance can be measured by the MIT test in the following manner, for example.

(Evaluation by Folding Endurance Test)

The void-containing layer (the void-containing layer according to the present invention) is cut into a strip-shaped cut piece with a size of 20 mm×80 mm. The thus-obtained cut piece is set in an MIT folding endurance tester (BE-202, manufactured by TESTER SANGYO CO., LTD.), and 1.0 N load is applied thereto. As a chuck portion for holding the void-containing layer, R 2.0 mm is used, and the load is applied 10000 times at most. The number of times of the load application at which the void-containing layer is fractured is determined as the folding endurance.

The film density of the void-containing layer according to the present invention indicating the void fraction is not limited to particular values. The lower limit of the film density is, for example, 1 g/cm³ or more, 5 g/cm³ or more, 10 g/cm³ or more, or 15 g/cm³ or more. The upper limit of the film density is, for example, 50 g/cm³ or less, 40 g/cm³ or less, or 30 g/cm³ or less, or 2.1 g/cm³ or less. The range of the film density is, for example, from 5 to 50 g/cm³, from 10 to 40 g/cm³, from 15 to 30 g/cm³, or from 1 to 2.1 g/cm³.

The film density can be measured in the following manner, for example.

(Evaluation of Film Density)

A void-containing layer (the void-containing layer according to the present invention) is formed on an acrylic film. Thereafter, the X-ray reflectance in a total reflection region is measured using an X-ray diffractometer (RINT-2000, manufactured by RIGAKU). Then, after fitting with Intensity at 2θ, the porosity (P %) is calculated from the total reflection critical angle of the void-containing layer and the base. The film density can be represented by the following formula.

Film density (%)=100(%) porosity (P%)

The void-containing layer according to the present invention may have, for example, a pore structure (porous structure) as mentioned above, and the pore structure may be an open-cell structure in which pores are interconnected with each other, for example. The open-cell structure means that, for example, in the void-containing layer, pores three-dimensionally communicate with each other. In other words, the open-cell structure means the state where void spaces inside the pore structure are interconnected with each other. When a porous material has an open-cell structure, this structure allows the bulk body to have a higher void fraction. However, in the case where closed-cell particles such as hollow silica particles are used, an open-cell structure cannot be formed. In contrast, in the void-containing layer according to the present invention, an open-cell structure can be formed easily for the following reason. Sol particles (pulverized products of a porous gel material for forming a sol) each have a dendritic structure, so that the open-cell structure is formed as a result of sedimentation and deposition of the dendritic particles in a coating film (a coating film formed of a sol containing pulverized products of the porous gel material). Further, it is more preferable that the void-containing layer according to the present invention form a monolith structure, which is an open-cell structure including two or more types of micropore distributions. The monolith structure refers to a layered structure including a structure in which nano-sized void spaces are present and an open-cell structure formed by aggregation of the nano-sized spaces, for example. When the monolith structure is formed, for example, the film strength is imparted by the minute void spaces whereas a high void fraction is achieved by the presence of the void spaces forming a bulky open-cell structure. Thus, both a film strength and a high void fraction can be attained. In order to form such a monolith structure, for example, first, in the porous gel material before being pulverized into the pulverized products, it is preferable to control the micropore distributions in a void-containing structure to be generated. Also, the monolith structure can be formed by, for example, controlling, at the time of pulverizing the porous gel material, the particle sizes of the pulverized products so that a desired particle size distribution can be obtained.

In the void-containing layer according to the present invention, the tearing crack growth rate which represents flexibility is not limited to particular rates. The lower limit of the tearing crack growth rate is, for example, 0.1% or more, 0.5% or more, or 1% or more, and the upper limit of the tearing crack growth rate is, for example, 3% or less. The range of the tearing crack growth rate is, for example, from 0.1% to 3%, or from 0.5% to 3%, or from 1% to 3%.

The tearing crack growth rate can be measured in the following manner, for example.

(Evaluation of Tearing Crack Growth Rate)

A void-containing layer (the void-containing layer according to the present invention) is formed on an acrylic film, and a strip-shaped piece with a size of 5 mm×140 mm is then obtained as a sample from the thus-obtained laminate. Then, the sample is chucked in a tensile testing machine (AG-Xplus, manufactured by Shimadzu Corporation) with a distance between chucks being 100 mm, and the tensile test is performed at a tensile speed of 0.1 m/min. The sample during the test is carefully observed, and the test is finished at the time when cracking of a part of the sample occurs, and the growth rate (%) at the time when the cracking occurs is regarded as the tearing crack growth rate.

In the void-containing layer according to the present invention, the haze value indicating the transparency is not limited to particular values. The lower limit of the haze is, for example, 0.1% or more, 0.2% or more, or 0.3% or more. The upper limit of the haze is, for example, 10% or less, 5% or less, or 3% or less. The range of the haze value is, for example, from 0.1% to 10%, from 0.2% to 5%, or from 0.3% to 3%.

The haze value can be measured in the following manner, for example.

(Evaluation of Haze Value)

A void-containing layer (the void-containing layer according to the present invention) is cut into a piece with a size of 50 mm×50 mm, and the thus-obtained cut piece is set in a haze meter (HM-150, manufactured by Murakami Color Research Laboratory) to measure the haze value. The haze value is calculated by the following formula.

Haze value (%)=[diffuse transmittance (%)/total light transmittance (%)]×100(%)

The "refractive index" of a given medium generally refers to the ratio of transmission speed of the wavefront of light in vacuum to the phase velocity of the light in the medium. The refractive index of the porous silicone material according to the present invention is not limited to particular values, and the upper limit thereof is, for example, 1.3 or less, less than 1.3, 1.25 or less, 1.2 or less, or 1.15 or less, the lower limit thereof is, for example, 1.05 or more, 1.06 or more, or 1.07 or more, and the range thereof is, for example, 1.05 or more and 1.3 or less, 1.05 or more and less than 1.3, 1.05 or more and 1.25 or less, 1.06 or more and less than 1.2, or 1.07 or more and 1.15 or less.

In the present invention, the refractive index refers to the one measured at a wavelength of 550 nm, unless otherwise stated. The method for measuring the refractive index is not particularly limited. For example, the refractive index can be measured in the following manner.

(Evaluation of Refractive Index)

A void-containing layer (the void-containing layer according to the present invention) is formed on an acrylic film, and the obtained laminate is then cut into a piece with a size of 50 mm×50 mm. The thus-obtained cut piece is adhered onto a surface of a glass plate (thickness: 3 mm) with a pressure-sensitive adhesive layer. The central portion (diameter: about 20 mm) of the back surface of the glass plate is painted entirely with a black magic marker, thereby preparing a sample that allows no reflection at the back surface of the glass plate. The sample is set in an ellipsometer (VASE, manufactured by J. A. Woollam Japan), and the refractive index is measured at a wavelength of 500 nm and at an incidence angle of 50° to 80°. The mean value of the thus-obtained measured values is set as the refractive index.

The thickness of the void-containing layer according to the present invention is not particularly limited, and the lower limit thereof is, for example, 0.05 μm or more or 0.1 μm or more, and the upper limit thereof is, for example, 1000 μm or less or 100 μm or less, and the range thereof is, for example, from 0.05 to 1000 μm or 0.1 to 100 μm.

The form of the void-containing layer according to the present invention is not limited to particular forms, and may be, for example, in the form of a film, a block, or the like.

The method for producing the void-containing layer according to the present invention is not particularly limited, and can be produced by, for example, the above-described method for producing the void-containing layer.

EXAMPLES

Examples of the present invention will be described below. It is to be noted, however, that the present invention is by no means limited to the following examples.

Reference Example 1

First, gelation of silicon compound (the following step (1)) and an aging step (the following step (2)) were performed to produce a gel (porous silicone material) having a porous structure. A gel form control step (3), a solvent replacement step (4), a concentration measurement (concentration control) and concentration adjustment step (5), and a gel pulverization step (6) were further performed thereafter to obtain a coating solution for forming a low refractive index layer (gel pulverized product-containing liquid). In the present reference example, the gel formation step (3) was performed as a different step from the step (1) as described below. The present invention, however, is not limited thereto, and, for example, the gel formation step (3) may be performed in the step (1).

(1) Gelation of Silicon Compound 9.5 kg of a silicon compound precursor MTMS was dissolved in 22 kg of DMSO. To the resultant mixture, 5 kg of 0.01 mol/L oxalic acid aqueous solution was added. The resultant mixture was stirred at room temperature for 120 minutes, whereby MTMS was hydrolyzed to generate tris(hydroxy)methylsilane.

3.8 kg of ammonia water with an ammonia concentration of 28% and 2 kg of pure water were added to 55 kg of DMSO. Thereafter, the above-described mixture that had been subjected to the hydrolysis treatment was further added thereto. The resultant mixture was stirred at room temperature for 60 minutes. After the stirring for 60 minutes, the mixture was introduced into a stainless container with a length: 30 cm×a width: 30 cm×a height: 5 cm in size and then stood still at room temperature, to cause gelation of tris(hydroxy)methylsilane. Thus, a gelled silicon compound was obtained.

(2) Aging Step

The gelled silicon compound obtained by the above gelation treatment was subjected to an aging treatment by incubating it at 40° C. for 20 hours. Thus, a cuboid gel mass was obtained. The amount of DMSO (a high-boiling-point solvent with a boiling point of 130° C. or higher) to be used in a raw material of this gel was about 83 wt % relative to the total amount of the raw material. Thus, it is obvious that this gel contains 50 wt % or more of the high-boiling-point solvent with a boiling point of 130° C. or higher. The amount of MTMS (a monomer as a structural unit of the gel) to be used in a raw material of this gel was about 8 wt % relative to the total amount of the raw material. Thus, it is obvious that this gel contains 20 wt % or less of a solvent (methanol in this case) with a boiling point of less than 130° C. to be generated in hydrolysis of the monomer (MTMS) that is a monomer as a structural unit of the gel.

(3) Gel Form Control Step

Water, which is a replacement solvent, was introduced on the gel synthesized in a stainless container with a size of 30 cm×30 cm×5 cm by the steps (1) and (2). Then, a cutting blade of a cutting tool was slowly inserted into the gel in the stainless container from the top to cut the gel into a cuboid each with a size of 1.5 cm×2 cm×5 cm.

(4) Solvent Replacement Step

Next, a solvent replacement step was performed as described in (4-1) to (4-3) below.

(4-1) After the "gel form control step (3)", the gelled silicon compound was immersed in water 8 times the weight of the gelled silicon compound, and stirred slowly for 1 hour so that only water was convected. After 1 hour, the water was replaced with water of the same weight and stirred further for 3 hours. Thereafter, the water was replaced again, and then the water was heated for 3 hours while slowly stirring at 60° C.

(4-2) After (4-1), the water was replaced with isopropyl alcohol 4 times the weight of the gelled silicon compound, and heated for 6 hours while stirring at 60° C.

(4-3) After (4-2), the isopropyl alcohol was replaced with isobutyl alcohol of the same weight and heated for 6 hours at 60° C. to replace the solvent contained in the gelled silicon compound with isobutyl alcohol. As described above, the gel for void-containing layer production according to the present invention was produced.

(5) Concentration Measurement (Concentration Control) and Concentration Adjustment Step After the solvent replacement step (4), block-shaped gel pieces were taken out, and the solvent adhered to the periphery of each gel piece was removed. Thereafter, the concentration of the solid in one block-shaped gel piece was measured by weight dry method. In the measurement, the concentration of the solid in each of six block-shaped gel pieces was measured, and variations of the measured concentrations from the average thereof were calculated, to determine reproducibility of the measured concentrations. The average of the concentrations of the solid in the respective six gel pieces was 5.20 wt %, variations of the concentrations in six gel pieces were within ±0.1%. Based on the measured concentrations, the concentration of the solid in the gel (the concentration of the gel) was adjusted to be about 3.0 wt % by adding isobutyl alcohol as a solvent.

(6) Gel Pulverization Step

The gel (gelled silicon compound) obtained after the concentration measurement (concentration control) and concentration adjustment step (5) was subjected to a total of two stages of pulverization including a first pulverization stage by continuous emulsification dispersion (Milder MDN304, manufactured by Pacific Machinery & Engineering Co. Ltd.) and a second pulverization stage by high pressure media-less pulverization (Star Burst HJP-25005, manufactured by Sugino Machine Limited). This pulverization treatment was performed in the following manner. First, 43.4 kg of the gel after being subjected to solvent replacement was prepared. This gel is a gelled silicon compound containing a solvent.

26.6 kg of isobutyl alcohol was added to 43.4 kg of this gel after being subjected to solvent replacement, and the mixture was then weighed. Thereafter, the mixture was subjected to a first pulverization stage by closed-circuit pulverization for 20 minutes and the second pulverization stage at a pulverization pressure of 100 MPa. Thus, a dispersion liquid (gel pulverized product-containing liquid) of nanometer-sized particles (pulverized products of the gel) in isobutyl alcohol was obtained.

The concentration of the solid content (the concentration of the gel) in the liquid (high-velocity, pulverized gel-containing liquid) measured after the first pulverization stage (coarse pulverization stage) and before the second pulverization stage (nano-pulverization stage) was 3.01 wt %. After the first pulverization stage (coarse pulverization stage) and before the second pulverization stage (nano-pulverization stage), the volume average particle diameter of the pulverized products of the gel was 3 to 5 and the shear viscosity of the liquid was 4000 mPa·s. At that time, the high-velocity, pulverized gel-containing liquid was not solid-liquid separated due to its high viscosity and could be handled as a homogeneous liquid, whereby the numerical values measured after the first pulverization stage (coarse pulverization stage) were employed as they were. After the second pulverization stage (nano-pulverization step), the volume average particle diameter of the pulverized products of the gel was 250 to 350 nm, and the shear viscosity of the liquid was 5 to 10 mPa·s. The concentration of the solid content (the concentration of the gel) in the liquid (gel pulverized product-containing liquid) measured again after the second pulverization stage (nano-pulverization stage) was 3.01 wt %, which was the same as that measured after the first pulverization stage (coarse pulverization stage).

In the present reference example, the average particle diameter of pulverized products (sol particles) of the gel after the first pulverization stage and the second pulverization stage was measured by a dynamic light scattering Nanotrac particle size analyzer (trade name: UPA-EX150, manufactured by NIKKISO CO., LTD.). In the present example, the shear viscosity of the liquid after the first pulverization stage and before the second pulverization stage was measured by a vibration-type viscometer (trade name: FEM-1000V, manufactured by SEKONIC CORPORATION). The same applies to the following examples and comparative example.

The proportion of functional groups (residual silanol groups) that are not involved in a crosslinked structure inside the gel among functional groups (silanol groups) of structural unit monomers of the solid content (gel) in the gel pulverized product-containing liquid, measured after the first pulverization step (coarse pulverization stage) was 11 mol %. The proportion of functional groups (residual silanol groups) that are not involved in a crosslinked structure inside the gel was measured by the method where the gel after drying is subjected to a solid state NMR (Si-NMR), and the proportion of residual silanol groups that are not involved in a crosslinked structure is calculated from the peak ratio obtained by the NMR.

In the manner described above, the coating solution for forming void-containing layer (gel pulverized product-containing liquid) of the present reference example (Reference Example 1) was produced. The peak pore diameter of the gel pulverized product (microporous particle) in the coating solution for forming void-containing layer (gel pulverized product-containing liquid) was measured by the method described above and found to be 12 nm.

Example 1

A liquid obtained by adding and mixing 0.36 g of 1.5% solution of a photobase generator (trade name: WPBG266, manufactured by Wako Pure Chemical Industries, Ltd.) in MIBK and 0.11 g of bis(trimethoxysilyl)ethane (TCI) (5% solution in MIBK) to 3 g of a coating solution for forming a low refractive index layer prepared in Reference Example 1 was coated and dried on a base (base film) made of an alicyclic structure-containing resin film (manufactured by Zeon Corporation, trade name: "ZEONOR: ZF16 film") having a thickness of 100 μm, thereby forming a low refractive index layer (refractive index: 1.18, void fraction: 59 vol %) having a film thickness of about 800 nm. The low refractive index layer was then irradiated with UV (300 mJ) from the low refractive index layer side, and a pressure-sensitive adhesive (first pressure-sensitive adhesive/adhesive layer) having a thickness of 12 μm with a separator (75 μm) was adhered to the low refractive index layer. Thereafter, the alicyclic structure-containing resin film (base film) was peeled off from the one-piece product of the pressure-sensitive adhesive (pressure-sensitive adhesive/adhesive layer) and the low refractive index layer. Thereafter, the pressure-sensitive adhesive (second pressure-sensitive adhesive/adhesive layer) having a thickness of 5 μm with another separator was adhered thereto on the surface from which the base film was peeled off, thereby obtaining a low refractive index layer-containing pressure-sensitive adhesive/adhesive sheet having a total thickness (whole thickness) of about 18 μm. The total thickness (whole thickness) refers to the total thickness of the laminate including the first pressure-sensitive adhesive/adhesive layer, the low refractive index layer, and the second pressure-sensitive adhesive/adhesive layer (without separator), and the same applies to the following examples and comparative examples. In this low refractive index layer-containing pressure-sensitive adhesive/adhesive sheet, the proportion of the thickness of the pressure-sensitive adhesive (pressure-sensitive adhesive/adhesive layer) (the total thicknesses of the first pressure-sensitive adhesive/adhesive layer and the second pressure-sensitive adhesive/adhesive layer) to the total thickness (whole thickness) was about 95%. Furthermore, the separator was peeled off from the low refractive index layer-containing pressure-sensitive adhesive/adhesive layer, and a light guide plate and a reflection plate in a backlight LED edge-lit type liquid crystal display (light guide plate type LCD) were adhered to each other to integrate using the laminate including the first pressure-sensitive adhesive/adhesive layer, the low refractive index layer, and the second pressure-sensitive adhesive/adhesive layer. Thus, the optical sheet for a light guide plate type liquid crystal display according to the present example was obtained. The results of brightness characteristic evaluation on this optical sheet for a light guide plate type liquid crystal display are summarized in Table 1.

Example 2

Furthermore, the separator was peeled off from the low refractive index layer-containing light guide plate type LCD, and a light guide plate and a reflection plate in a backlight LED edge-lit type liquid crystal display (light guide plate type LCD) were adhered to each other to integrate using the light guide plate type LCD including the first pressure-sensitive adhesive/adhesive layer, the low refractive index layer, and the second pressure-sensitive adhesive/adhesive layer. That is, the optical sheet for a light guide plate type liquid crystal display of the present example is the same as that of Example 1 except that a pressure-sensitive adhesive (pressure-sensitive adhesive/adhesive layer) is not present between the reflection plate and the low refractive index layer, and the reflection plate and the low refractive index layer are laminated directly on each other. The results of brightness characteristic evaluation on this optical sheet for a light guide plate type liquid crystal display are summarized in Table 1.

Example 3

A light guide plate and a reflection plate in a backlight LED edge-lit type liquid crystal display (light guide plate type LCD) were integrated in the same manner as in Example 1 except that the low refractive index layer coating solution was changed to a liquid obtained by adding and mixing 0.18 g of 1.5% solution of a photobase generator (trade name: WPBG266, manufactured by Wako Pure Chemical Industries, Ltd.) in MIBK and 0.05 g of bis(trimethoxysilyl)ethane (TCI) (5% solution in MIBK) to 3 g of the coating solution for forming a low refractive index layer so that the refractive index becomes 1.14 (void fraction: 61%). Thus, an optical sheet for a light guide plate type liquid crystal display was obtained. The results of brightness characteristic evaluation on this optical sheet for a light guide plate type liquid crystal display are summarized in Table 1.

Example 4

The light guide plate in the optical sheet for a light guide plate type liquid crystal display of Example 1 was adhered to a diffusion plate via a laminate including the first pressure-sensitive adhesive/adhesive layer, the low refractive index layer, and the second pressure-sensitive adhesive/adhesive layer in the same manner as in Example 1. Thus, an optical sheet for a light guide plate type liquid crystal display (an integrated sheet of reflection plate/light guide plate/diffusion plate) of the present example was obtained. The results of brightness characteristic evaluation on this optical sheet for a light guide plate type liquid crystal display are summarized in Table 1.

Example 5

A light guide plate and a reflection plate in a backlight LED edge-lit type liquid crystal display (light guide plate type LCD) were integrated in the same manner as in Example 1 except that an acrylic film having a thickness of 40 μm was used as a base film instead of the base film used in Example 1, and a pressure-sensitive adhesive (second pressure-sensitive adhesive/adhesive layer) having a thickness of 5 μm with a separator was adhered to the surface of the base film opposite to the low refractive index layer. Thus, an optical sheet for a light guide plate type liquid crystal display was obtained. That is, the optical sheet for a light guide plate type liquid crystal display of the present example was the same as that of Example 1 except that an acrylic film (base film) with a thickness of 40 μm was intervened between the low refractive index layer and the second pressure-sensitive adhesive/adhesive layer. The results of brightness characteristic evaluation on this optical sheet for a light guide plate type liquid crystal display are summarized in Table 1.

Comparative Example 1

An optical sheet for a light guide plate type liquid crystal display was obtained in the same manner as in Example 1 except that a light guide plate and a reflection plate in a backlight LED edge-lit type liquid crystal display (light guide plate type LCD) were adhered only with a pressure-sensitive adhesive with a thickness of 12 μm without intervention of the low refractive index layer. The results of brightness characteristic evaluation on this optical sheet for a light guide plate type liquid crystal display are summarized in Table 1.

Comparative Example 2

A light guide plate and a reflection plate in the same backlight LED edge-lit type liquid crystal display (light guide plate type LCD) as used in Example 1 were laminated on each other via an air layer without integration. That is, only an air layer was intervened between the light guide plate and the reflection plate, and the low refractive index layer and the pressure-sensitive adhesive/adhesive layer (pressure-sensitive adhesive) were not used. The results of brightness characteristic evaluation in this case are summarized in Table 1.

TABLE 1

| | Ex. 1 | Ex. 2 | Ex. 3 | Ex. 4 | Ex. 5 | Comp. Ex. 1 | Comp. Ex. 2 |
|---|---|---|---|---|---|---|---|
| Refractive index of low refractive index layer | 1.18 | 1.18 | 1.14 | 1.18 | 1.18 | No void-containing layer | — |
| Optical characteristic (brightness uniformity) | ○ Uniform | ○ Uniform | ○ Uniform | ○ Uniform | ○ Uniform | x Nonuniform | x Nonuniform |
| Brightness | ○ | ○ | ○ | ○ | ○ | x Reduced | Δ |
| Yield in assembly process | ○ | ○ | ○ | ○ | ○ | ○ | x Reduced due to contamination |
| Configuration | Reflection plate/Pressure-sensitive adhesive/Low refractive index layer/Pressure-sensitive | Reflection plate/Low refractive index layer/Low refractive index layer/Pressure- | Reflection plate/Pressure-sensitive adhesive/Low refractive index layer/Pressure-sensitive | Reflection plate/Pressure-sensitive adhesive/Low refractive index layer/Pressure-sensitive adhesive/Light | Reflection plate/Pressure-sensitive adhesive/Base/Low refractive index layer/Pressure-sensitive | Reflection plate/Pressure-sensitive adhesive/Light guide plate | Reflection plate/Light guide plate |

TABLE 1-continued

| | Ex. 1 | Ex. 2 | Ex. 3 | Ex. 4 | Ex. 5 | Comp. Ex. 1 | Comp. Ex. 2 |
|---|---|---|---|---|---|---|---|
| | adhesive/Light guide plate | sensitive adhesive/Light guide plate | adhesive/Light guide plate | guide plate/ Pressure-sensitive adhesive/Low refractive index layer/Pressure-sensitive adhesive/Diffusion plate | adhesive/Light guide plate | | |

In Table 1, the brightness characteristics (brightness uniformity) were measured as follows.

(Method for Measuring Brightness Characteristics)

The TV having an LED edge-lit type backlight was displayed in white using an optical sheet for a light guide plate type liquid crystal display of each of the examples and the comparative examples, obtained by integrating a light guide plate and a prism sheet (provided that in Comparative Example 2, the lamination was performed via an air layer without integration), and the brightness of each coordinate was measured from the LED-incidence side to the terminal side of the light guide plate by a spectroradiometer SR-UL2 (trade name, manufactured by TOPCON TECHNOHOUSE CORPORATION).

As summarized in Table 1, when the light guide plate and the reflection plate were integrated using each of the optical sheets for a light guide plate type liquid crystal display of Examples 1 to 5, light from the LED propagated from the incident side to the terminal side of the light guide plate, and the brightness characteristics were excellent (brightness was uniform). In addition, contamination did not occur at the time of integration of the light guide plate and the reflection plate, and the yield in an assembly process was excellent.

In contrast, in the comparative examples, light was leaked before propagating to the terminal side of the light guide plate and did not spread to the terminal side. That is, in Comparative Example 1 where a light guide plate and a reflection plate were integrated only with a pressure-sensitive adhesive (pressure-sensitive adhesive/adhesive layer) without using any low refractive index layer, the brightness was reduced compared with those in the examples. In addition, in Comparative Example 2 where a light guide plate and a reflection plate were laminated on each other via an air layer without integration, brightness unevenness occurred, and a yield in an assembly process was reduced by contamination.

Furthermore, although the base film was incorporated in the optical sheet for a light guide plate type liquid crystal display of Example 5, the base film was not incorporated in (was peeled off from) the optical sheet for a light guide plate type liquid crystal display of each of the other examples, whereby allowing the thickness of the optical sheet for a light guide plate type liquid crystal display to be reduced.

INDUSTRIAL APPLICABILITY

As described above, the present invention can provide an optical sheet for a light guide plate type liquid crystal display, including a low refractive index layer having an extremely low refractive index, a backlight unit for a light guide plate type liquid crystal display, and a light guide plate type liquid crystal display.

This application claims priority from Japanese Patent Application No. 2017-016190 filed on Jan. 31, 2017. The entire disclosure of this Japanese patent application is incorporated herein by reference.

REFERENCE SIGNS LIST

10: base
20: low refractive index layer
20': coating film (precursor layer)
20": gel pulverized product-containing liquid
30: pressure-sensitive adhesive/adhesive layer (pressure-sensitive adhesive)
40: optical film (first optical film or second optical film)
101: delivery roller
102: coating roller
105: winding roller
106: roll
110: oven zone
111: hot air fan (heating unit)
120: chemical treatment zone
121: lamp (light irradiation unit) or hot air fan (heating unit)
201: delivery roller
202: liquid reservoir
203: doctor (doctor knife)
204: micro gravure
210: oven zone
211: heating unit
220: chemical treatment zone
221: lamp (light irradiation unit) or hot air fan (heating unit)
251: winding roller
1000, 2000, 6000: light guide plate type liquid crystal display (light guide plate type LCD)
A1 to A6, A12, A123: unit
1010: light guide plate (first optical film or second optical film)
1020: reflection plate (first optical film or second optical film)
1030: prism sheet
1040: diffusion sheet (prism sheet with diffusion)
1050: brightness enhancement film
1060: lower polarizing plate
1070: pressure-sensitive adhesive (pressure-sensitive adhesive/adhesive layer)
1080: liquid crystal panel
1090: diffusion plate (first optical film or second optical film)

The invention claimed is:

1. An optical sheet for a light guide plate type liquid crystal display, the optical sheet comprising:
a first optical film;
a low refractive index layer; and
a second optical film; the first optical film, a first pressure-sensitive adhesive/adhesive layer, the low refractive index layer, a second pressure-sensitive adhesive/adhesive layer and the second optical film being laminated in this order, wherein the low refractive index layer has a refractive index of 1.25 or less, and wherein the low refractive index layer is a void-containing layer in which microporous particles containing residual silanol groups are crosslinked to each other in the presence of a catalyst.

2. The optical sheet according to claim 1, wherein each of the first optical film or the second optical film is a lower polarizing plate, a brightness enhancement film, a prism sheet, a diffusion plate, a light guide plate, or a reflection plate.

3. The optical sheet according to claim 1, wherein at least one of the first optical film or the second optical film is a light guide plate.

4. The optical sheet according to claim 1, wherein at least one of the first optical film or the second optical film is a light guide plate, and the other is an optical member other than the light guide plate.

5. The optical sheet according to claim 1, wherein the low refractive index layer is a void-containing layer having a void fraction of 35 vol % or more.

6. A backlight unit for a light guide plate type liquid crystal display, the backlight unit comprising:
the optical sheet according to claim 1;
an edge light; and
a light guide plate.

7. The backlight unit according to claim 6, wherein the edge light is an LED edge light.

8. A light guide plate type liquid crystal display comprising the backlight unit according to claim 6.

9. An optical sheet for a light guide plate type liquid crystal display, the optical sheet comprising:
a first optical film;
a first pressure-sensitive adhesive/adhesive layer;
a low refractive index layer;
a second pressure-sensitive adhesive/adhesive layer; and
a second optical film; the first optical film, the first pressure-sensitive adhesive/adhesive layer, the low refractive index layer, the second pressure-sensitive adhesive/adhesive layer, and the second optical film being laminated in this order, wherein at least one of the first optical film or the second optical film is a light guide plate, wherein the low refractive index layer has a refractive index of 1.25 or less, wherein the low refractive index layer is a void-containing layer in which microporous particles are chemically bonded, and wherein a total thickness of the first pressure-sensitive adhesive/adhesive layer and the second pressure-sensitive adhesive/adhesive layer is 85% or more relative to a total thickness of the first pressure-sensitive adhesive/adhesive layer, the low refractive index layer, and the second pressure-sensitive adhesive/adhesive layer, and wherein the low refractive index layer is a void-containing layer in which microporous particles containing residual silanol groups are crosslinked to each other in the presence of a catalyst.

* * * * *